US009805173B2

(12) United States Patent
Kuno et al.

(10) Patent No.: US 9,805,173 B2
(45) Date of Patent: Oct. 31, 2017

(54) INFORMATION PROCESSING DEVICE, INFORMATION STORAGE DEVICE, SERVER, INFORMATION PROCESSING SYSTEM, INFORMATION PROCESSING METHOD AND MEDIUM FOR REPRODUCTION OF ENCRYPTED CONTENT

(71) Applicant: Sony Corporation, Tokyo (JP)

(72) Inventors: Hiroshi Kuno, Kanagawa (JP); Yoshiyuki Kobayashi, Tokyo (JP); Takamichi Hayashi, Tokyo (JP); Katsumi Muramatsu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 23 days.

(21) Appl. No.: 14/351,627

(22) PCT Filed: Jun. 26, 2013

(86) PCT No.: PCT/JP2013/067457
§ 371 (c)(1),
(2) Date: Apr. 14, 2014

(87) PCT Pub. No.: WO2014/030427
PCT Pub. Date: Feb. 27, 2014

(65) Prior Publication Data
US 2014/0237235 A1    Aug. 21, 2014

(30) Foreign Application Priority Data
Aug. 24, 2012   (JP) .................................. 2012-185631

(51) Int. Cl.
*H04N 21/44*    (2011.01)
*G06F 21/10*    (2013.01)
(Continued)

(52) U.S. Cl.
CPC .......... *G06F 21/10* (2013.01); *G11B 20/0021* (2013.01); *G11B 20/00086* (2013.01);
(Continued)

(58) Field of Classification Search
CPC .............. H04L 9/0866; H04L 2209/60; H04N 21/4181; H04N 21/4184; H04N 21/4753;
(Continued)

(56) References Cited

U.S. PATENT DOCUMENTS 6,151,394 A * 11/2000 Tatebayashi et al. ......... 380/283
6,792,113 B1    9/2004 Ansell et al.
(Continued)

FOREIGN PATENT DOCUMENTS

| JP | 2000-101565 A | 4/2000 |
|----|---------------|--------|
| JP | 2002-099514 A | 4/2002 |
| JP | 2003-518351 A | 6/2003 |
| JP | 2008-098765 A | 4/2008 |
| JP | 2009-087497 A | 4/2009 |
| JP | 2009-238212 A | 10/2009 |

*Primary Examiner* — Harunur Rashid
(74) *Attorney, Agent, or Firm* — Chip Law Group

(57) ABSTRACT

An information storage device including one or more processors configured to store an encrypted content and to control access of an external device to the information storage device is provided. The one or more processors are further configured to store a converted title key obtained by converting a title key which is an encryption key to be applied to decryption of the encrypted content, and a user token obtained by converting binding secret information to be applied to calculate the title key from the converted title key. The one or more processors are further configured to allow the external device having a confirmed access right to the information storage device to read out the user token.

12 Claims, 15 Drawing Sheets

(51) Int. Cl.

| | |
|---|---|
| *H04L 9/08* | (2006.01) |
| *H04N 21/418* | (2011.01) |
| *H04N 21/4627* | (2011.01) |
| *H04N 21/475* | (2011.01) |
| *H04N 21/8355* | (2011.01) |
| *H04N 21/4405* | (2011.01) |
| *G11B 20/00* | (2006.01) |

(52) U.S. Cl.
CPC ...... *G11B 20/00855* (2013.01); *H04L 9/0866* (2013.01); *H04N 21/4181* (2013.01); *H04N 21/4184* (2013.01); *H04N 21/4405* (2013.01); *H04N 21/4627* (2013.01); *H04N 21/4753* (2013.01); *H04N 21/8355* (2013.01); *H04L 2209/60* (2013.01)

(58) Field of Classification Search
CPC . H04N 21/8355; H04N 21/4627; G06F 21/10
USPC ........................................................ 713/165
See application file for complete search history.

(56) References Cited

U.S. PATENT DOCUMENTS

| | | | |
|---|---|---|---|
| 7,603,563 | B2 | 10/2009 | Ansell et al. |
| 8,327,145 | B2 | 12/2012 | Kim |
| 2001/0034714 | A1* | 10/2001 | Terao ...................... G06F 21/10 705/57 |
| 2006/0059573 | A1* | 3/2006 | Jung et al. ........................ 726/31 |
| 2006/0200855 | A1* | 9/2006 | Willis ................... H04L 9/3213 726/2 |
| 2009/0089593 | A1* | 4/2009 | Kuno et al. ..................... 713/193 |
| 2010/0205461 | A1* | 8/2010 | Satou et al. ................... 713/193 |
| 2011/0213969 | A1* | 9/2011 | Nakhjiri ............... H04L 63/061 713/158 |
| 2013/0054971 | A1* | 2/2013 | Yamaguchi et al. .......... 713/171 |
| 2013/0067230 | A1 | 3/2013 | Kim |
| 2013/0145140 | A1* | 6/2013 | Hsien ..................... G06F 21/575 713/2 |

* cited by examiner

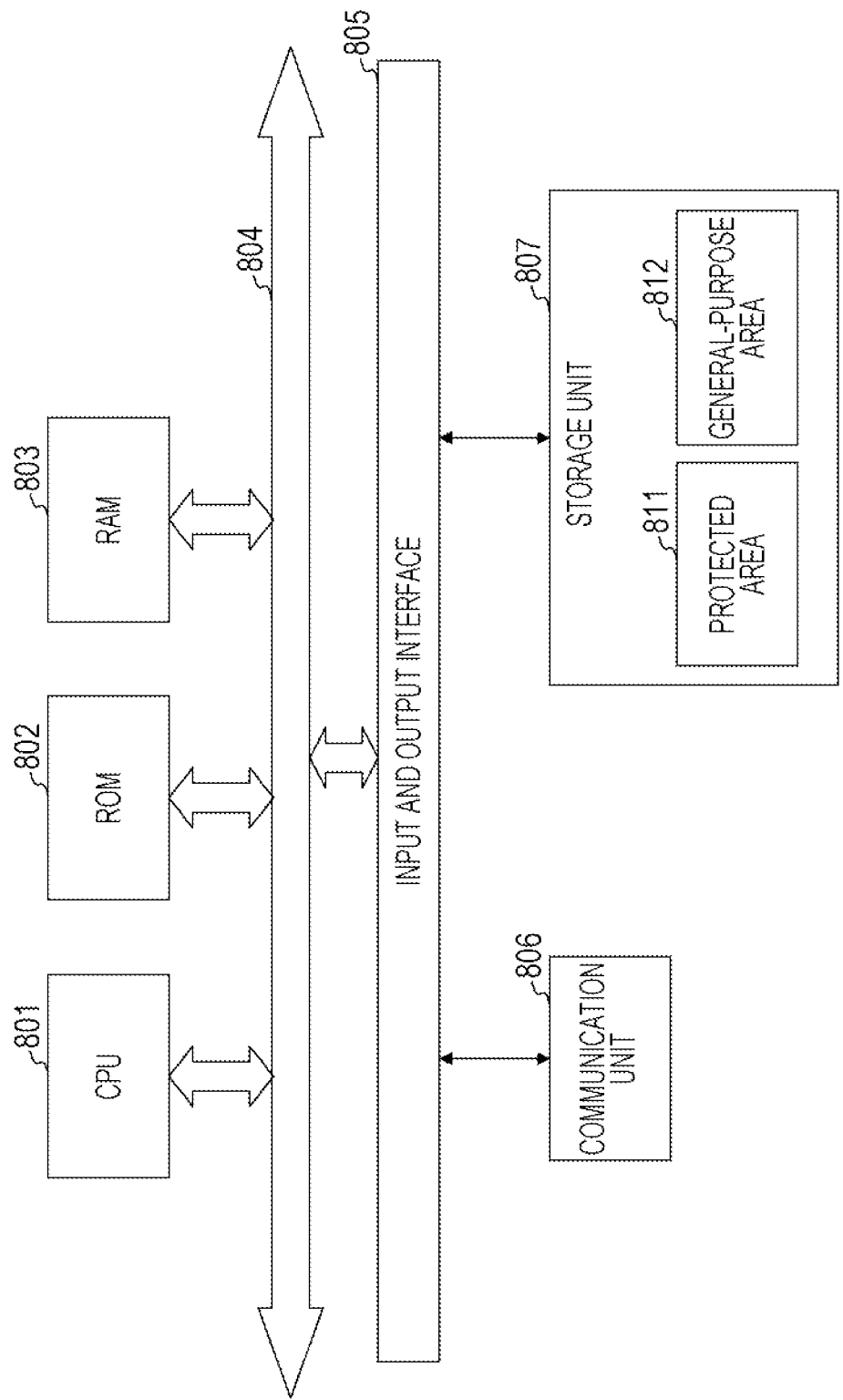

INFORMATION PROCESSING DEVICE, INFORMATION STORAGE DEVICE, SERVER, INFORMATION PROCESSING SYSTEM, INFORMATION PROCESSING METHOD AND MEDIUM FOR REPRODUCTION OF ENCRYPTED CONTENT

CROSS-REFERENCE TO RELATED APPLICATION

The present application is a national phase entry under 35 U.S.C. §371 of International Application No. PCT/JP2013/067457 filed Jun. 26, 2013, published on Feb. 27, 2014 as WO 2014/030427 A1, which claims priority from Japanese Patent Application No. JP 2012-185631 filed in the Japanese Patent Office on Aug. 24, 2012.

TECHNICAL FIELD

The present disclosure relates to an information processing device, an information storage device, a server, an information processing system, an information processing method, and a program, and more particularly, to an information processing device which controls the use of a content, an information storage device, a server, an information processing system, an information processing method, and a program.

BACKGROUND ART

For example, contents such as a movie or music are provided to users through various media such as a digital versatile disc (DVD), a Blu-ray Disc (registered trademark), or a flash memory, a network such as the Internet, or a broadcast wave. Users can reproduce contents using various information processing devices, for example, a PC, a portable terminal, a recording and reproducing device such as a BD player, and a television.

However, copyrights, distribution rights, and the like of many contents such as music data or image data which are provided to users are possessed by the creators or sellers thereof. Therefore, content providers often performs predetermined content usage control when providing the contents to users.

According to a digital recording device and a recording medium, it is possible to repeatedly record and reproduce, for example, an image or audio without degradation, and thus there is a problem in that the delivery of illegally copied contents through the Internet and the use of illegally copied contents such as the distribution of a so-called pirated disc have become pervasive.

Encryption processing of contents is an example of a specific configuration for preventing such unauthorized use of contents. The configuration is set such that a content to be provided to a user is encrypted to allow only an authorized user to acquire the encryption key thereof. These pieces of processing are disclosed in, for example, PTL 1 (Japanese Unexamined Patent Application Publication No. 2008-98765) and the like.

An encryption key which is used to decrypt encrypted data is recorded together with an encrypted content in a user's medium, for example, a memory card, at the time of purchasing, for example, downloading the encrypted content.

At the time of reproducing a content, a reproducing device equipped with a memory card reads out an encrypted content and an encryption key from the memory card, decrypts the encrypted content by applying the encryption key, thereby allowing the content to be reproduced.

In this manner, the encrypted content and the encryption key are recorded as one data set in a medium such as a memory card, and thus a so-called medium binding type content usage control of associating a content with one medium is realized.

Such a medium binding type content can be reproduced in various reproducing devices on which a medium can be mounted.

Many of current content acquisition processes are performed by content downloading processing through a network. Users store a downloaded content in a medium such as a memory card and mount the medium on various reproducing devices to read out the content from the medium and reproduce the content.

However, there is a possibility of the medium storing the content being damaged or a possibility of a user erroneously deleting the content from the medium.

In order to respond to such a problem, content distribution service providers such as a content provider have taken the following responses, for example.

(a) A content is allowed to be downloaded to a plurality of media.

(b) A content is allowed to be downloaded again in response to a request that a user has damaged a content storing medium or has erroneously deleted a content.

For example, user convenience is improved by taking the above-described responses.

However, in reality, a request indicating damage of a medium or erroneous deletion of a content is not always made correctly, and there is a possibility of the request being a false request.

Therefore, while downloading to a plurality of media and re-downloading improve user convenience, this downloading also becomes a factor that increases unauthorized use and distribution of a content.

There is a possibility of an unauthorized user making a request indicating damage of a medium, in spite of the medium not being damaged, to illegally download a content, to record the content in a plurality of media, and to assign or resell the media to other people.

When such processing is performed, unauthorized use of a content becomes pervasive.

As a configuration for preventing such unauthorized use, the following content usage control is also suggested and is implemented in some parts.

That is, a user's reproducing device is connected to a content management server before reproducing a content, and user account information such as a user ID is transmitted to a server. The server confirms that a user account is an account of a legally-registered user, and transmits content reproduction permission to the reproducing device on condition that the confirmation is made. The user's reproducing device starts content reproduction on condition that reproduction permission information is received from the server.

A system performs such a control.

However, in order to perform the above-described control, the user reproducing device has a communication function for communicating with the server and is required to be installed in an environment where communication can be performed.

Therefore, for example, in a reproducing device or car navigation system with no communication function, or in an environment where communication cannot be performed such as the inside of an airplane, reproduction permission information cannot be received from a server, and thus a content cannot be reproduced.

In addition, there may be a problem in that a content cannot be reproduced even during a period when a server stops operating due to, for example, the failure or maintenance of the server.

CITATION LIST

Patent Literature

PTL 1: Japanese Unexamined Patent Application Publication No. 2008-98765

SUMMARY OF INVENTION

Technical Problem

The present disclosure is contrived in view of, for example, the above-described problem, and an object thereof is to provide an information processing device which realizes content usage control for allowing a content to be used on condition of the establishment of user authentication by executing user authentication processing in accordance with a predetermined sequence even using a reproducing device with no communication function or under an environment where communication cannot be executed, an information storage device, a server, an information processing system, an information processing method, and a program.

Solution to Problem

According to a first aspect of the present disclosure, provided is an information storage device including a storage unit that stores an encrypted content, and a data processing unit that controls access of an external device to the storage unit. The storage unit stores a converted title key obtained by converting a title key which is an encryption key to be applied to decryption of the encrypted content, and a user token obtained by converting binding secret information to be applied to calculate the title key from the converted title key. The data processing unit allows an external device having an access right to the storage unit being confirmed therein to read out the user token.

Furthermore, in an embodiment of the information storage device of the present disclosure, the user token is data capable of being calculated by computation processing with an authentication key which is generated on the basis of user identification information, included in registration account information of a server performing use management of the encrypted content, and the binding secret information.

Furthermore, in an embodiment of the information storage device of the present disclosure, the user token is calculated data based on computation processing with an authentication key which is generated on the basis of a user ID and a user password, included in registration account information of a server performing use management of the encrypted content, and the binding secret information.

Furthermore, in an embodiment of the information storage device of the present disclosure, the user token is encrypted data based on the authentication key with respect to data including the binding secret information.

Furthermore, in an embodiment of the information storage device of the present disclosure, the user token is encrypted data based on the authentication key with respect to data including the binding secret information and a verification value for the binding secret information.

Furthermore, in an embodiment of the information storage device of the present disclosure, the binding secret information is a value inherent in the encrypted content.

Furthermore, according to a second aspect of the present disclosure, provided is an information processing device including a data processing unit which is equipped with a medium storing an encrypted content encrypted using a title key and has a data processing unit that executes decryption processing of the encrypted content. The data processing unit acquires, from the medium, a converted title key obtained by converting a title key which is an encryption key to be applied to the decryption of the encrypted content, and a user token obtained by converting binding secret information to be applied to calculate the title key from the converted title key, generates an authentication key on the basis of user identification information acquired by input processing through an input unit or read-out processing from a memory, calculates the binding secret information by computation processing between the user token and the authentication key, calculates the title key from the converted title key by applying the calculated binding secret information, and executes the decryption processing of the encrypted content by applying the calculated title key.

Furthermore, in an embodiment of the information processing device of the present disclosure, the data processing unit executes computation processing with respect to a user ID and a user password which are acquired by input processing through the input unit or read-out processing from the memory to generate the authentication key.

Furthermore, in an embodiment of the information processing device of the present disclosure, the data processing unit executes decryption processing of the user token to which the authentication key is applied, to calculate the binding secret information.

Furthermore, in an embodiment of the information processing device of the present disclosure, the data processing unit executes decryption processing of the user token to which the authentication key is applied to calculate the binding secret information and a verification value for the binding secret information, and executes verification processing of the calculated binding secret information by using the calculated verification value.

Furthermore, in an embodiment of the information processing device of the present disclosure, the data processing unit executes exclusive OR computation between the binding secret information and the converted title key to calculate a title key.

Furthermore, according to a third aspect of the present disclosure, provided is a server transmitting an encrypted content to an information storage device. The server executes processing of receiving user identification information from an information processing device equipped with the information storage device, generating a user token by computation processing to which the received user identification information is applied, and a converted title key which is converted data of a title key to be applied to encryption processing of the encrypted content, and transmitting the generated user token and converted title key as stored data of the information storage device.

Furthermore, in an embodiment of the server of the present disclosure, the server receives a user ID and a password as the user identification information, and generates the authentication key by computation processing with respect to the user ID and the password.

Furthermore, in an embodiment of the server of the present disclosure, the server generates binding secret information as an inherent value corresponding to the encrypted content, and generates the user token by encryption processing to which the authentication key for the binding secret information is applied.

Furthermore, according to a fourth aspect of the present disclosure, provided is an information processing system including an information storage device that stores an encrypted content, a converted title key obtained by converting a title key which is a decryption key of the encrypted content, and a user token obtained by converting binding secret information to be applied to calculate the title key from the converted title key, and an information processing device that executes reproduction processing of the encrypted content. The information processing device acquires the converted title key and the user token from the information storage device, generates an authentication key on the basis of user identification information which is acquired by input processing through an input unit or read-out processing from a memory, calculates the binding secret information by computation processing between the user token and the authentication key, calculates the title key from the converted title key by applying the calculated binding secret information, and executes the decryption processing of the encrypted content by applying the calculated title key.

Furthermore, according to a fifth aspect of the present disclosure, provided is an information processing method which is executed in an information storage device. The information storage device includes a storage unit that stores an encrypted content, a converted title key obtained by converting a title key which is an encryption key to be applied to decryption of the encrypted content, and a user token obtained by converting binding secret information to be applied to calculate the title key from the converted title key; and a data processing unit that controls access of an external device to the storage unit. The data processing unit allows an external device having an access right to the storage unit being confirmed therein to read out the user token.

Furthermore, according to a sixth aspect of the present disclosure, provided is an information processing method of decrypting and reproducing a content, stored in a medium, in an information processing device. The information processing device includes a data processing unit which is equipped with a medium storing an encrypted content encrypted using a title key and has a data processing unit that executes decryption processing of the encrypted content. The data processing unit acquires, from the medium, a converted title key obtained by converting a title key which is an encryption key to be applied to the decryption of the encrypted content, and a user token obtained by converting binding secret information to be applied to calculate the title key from the converted title key, generates an authentication key on the basis of user identification information acquired by input processing through an input unit or read-out processing from a memory, calculates the binding secret information by computation processing between the user token and the authentication key, calculates the title key from the converted title key by applying the calculated binding secret information, and executes the decryption processing of the encrypted content by applying the calculated title key.

Furthermore, according to a seventh aspect of the present disclosure, provided is an information processing method which is executed in a server transmitting a content to an information storage device. The information processing method includes processing of receiving user identification information from an information processing device equipped with the information storage device, generating a user token by computation processing to which the received user identification information is applied, and a converted title key which is converted data of a title key to be applied to encryption processing of the encrypted content, and transmitting the generated user token and converted title key as stored data of the information storage device.

Furthermore, according to an eighth aspect of the present disclosure, provided is a program causing an information storage device to execute information processing. The information storage device includes a storage unit that stores an encrypted content, a converted title key obtained by converting a title key which is an encryption key to be applied to decryption of the encrypted content, and a user token obtained by converting binding secret information to be applied to calculate the title key from the converted title key; and a data processing unit that controls access of an external device to the storage unit. The program causes the data processing unit to execute processing of allowing an external device having an access right to the storage unit being confirmed therein to read out the user token.

Furthermore, according to a ninth aspect of the present disclosure, provided is a program causing an information processing device to decrypt and reproduce a content stored in a medium. The information processing device includes a data processing unit which is equipped with a medium storing an encrypted content encrypted using a title key and has a data processing unit that executes decryption processing of the encrypted content. The program causes the data processing unit to execute processing of acquiring, from the medium, a converted title key obtained by converting a title key which is an encryption key to be applied to the decryption of the encrypted content, and a user token obtained by converting binding secret information to be applied to calculate the title key from the converted title key, processing of generating an authentication key on the basis of user identification information acquired by input processing through an input unit or read-out processing from a memory, processing of calculating the binding secret information by computation processing between the user token and the authentication key, processing of calculating the title key from the converted title key by applying the calculated binding secret information, and decryption processing of the encrypted content by applying the calculated title key.

Meanwhile, the program of the present disclosure is a program which can be provided by a recording medium or a communication medium providing the program in a computer-readable format to an information processing device or a computer system capable of executing, for example, various program codes. By providing such a program in a computer-readable format, processing according to the program is realized on the information processing device or the computer system.

Further objects, features, and advantages of the present disclosure will become apparent from more detailed descriptions based on an embodiment described below according to the present disclosure and the accompanying drawings. The term "system" used in this specification means a logical set configuration of a plurality of devices and is not limited to a system in which devices having respective configurations are included in the same housing.

Advantageous Effects of Invention

According to an embodiment of the present disclosure, content usage control is realized on condition of the establishment of user authentication, without having to communicate with a server or the like.

Specifically, an information storage device such as a memory card stores an encrypted content, a converted title key obtained by converting a title key which is an encryption key, and a user token obtained by converting binding secret information to be applied to calculate the title key from the converted title key. A reproducing device that decrypts and reproduces the encrypted content acquires the converted title key and the user token, and generates an authentication key on the basis of user identification information such as a user ID. Furthermore, the reproducing device calculates the binding secret information by computation processing between the user token and the authentication key, calculates the title key from the converted title key by applying the calculated binding secret information, and executes decryption processing of the encrypted content by applying the calculated title key.

Based on such configurations, it is possible to realize content usage control on condition of the establishment of user authentication, without having to communicate with a server or the like.

BRIEF DESCRIPTION OF DRAWINGS

FIG. 15 is a diagram illustrating an example of a hardware configuration of an information storage device such as a memory card.

DESCRIPTION OF EMBODIMENTS

Hereinafter, an information processing device, an information storage device, a server, an information processing system, and an information processing method, and a program of the present disclosure will be described in detail with reference to the accompanying drawings. Meanwhile, the description will be given in accordance with the following list.

1. With regard to Outline of Processing of Providing and Using Content
2. With regard to Configuration Example of Information Storage Device
3. With regard to Example of Data Configuration of Usage Control Information
4. With regard to Access Control with respect to Protected Area of Memory Card based on Certificate
5. With regard to Content Downloading and Sequence of Recording Processing with respect to Information Storage Device
6. With regard to Processing of Reproducing Content Stored in Medium
7. With regard to Embodiment to which Secret Information corresponding to Reproducing Device or Reproduction Application is Applied
8. With regard to Example of Hardware Configurations of Respective Devices
9. Conclusion of Configuration according to the Present Disclosure

[1. With Regard to Outline of Processing of Providing and Using Content]

Hereinafter, a configuration of the present disclosure will be described with reference to the accompanying drawings.

First, an outline of processing of providing and using a content will be described with reference to FIG. 1 and the subsequent drawings.

Figure 1:
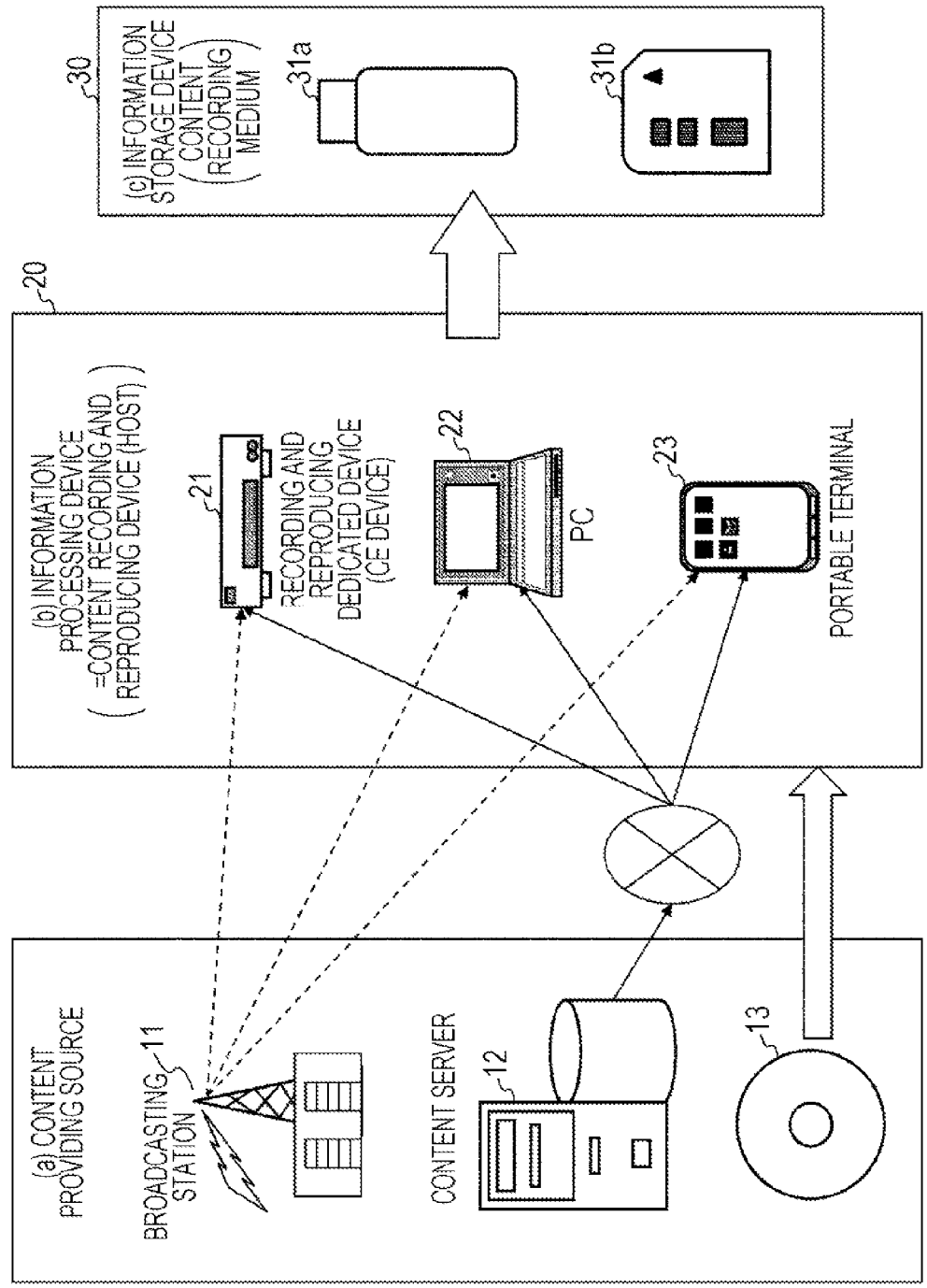
FIG. 1 is a diagram illustrating outlines of processing of providing and using a content.

In FIG. 1, the following examples are illustrated from the left of the drawing.

(a) Content providing source
(b) Information processing device (content recording and reproducing device (host))
(c) Information storage device (content recording medium)

Here, (c) information storage device (content recording medium) 30 is a medium, in which a user records a content, which is used in processing of reproducing the content. Herein, memory cards 31a, 31b are exemplified as information storage devices including, for example, a flash memory.

A user records various contents, for example, music and movies, in an information storage device (content recording medium) 30 such as a memory card 31 and uses the contents. Such contents include a content as a target of use control, for example, a content as a target of copyright management.

The content as a target of use control means a content for which unregulated copying or distribution of copied data are inhibited, a content for which use period is limited, or the like. Meanwhile, when a content under the use control is recorded in the memory card 31, usage control information (usage rule file) having copying limitation information or use period limitation information corresponding to the content recorded therein is provided and recorded together.

In addition, a license management device (LA) performing use management of a content generates a revocation list in which an identifier (ID) of an unauthorized device or an identifier (ID) such as a public key certificate of the unauthorized device is registered, with respect to an information processing device or an information storage device which is identified as an unauthorized device, and provides the generated revocation list to each device. An electronic signature through a secret key of the license management device (LA: License Authority) is set in the revocation list. The revocation list is sequentially updated.

For example, at the time of recording a content in a memory card or reproducing the content from the memory card, in mutual authentication processing executed between the memory card and a device having access to the memory card, the revocation list is referred to in both the devices. In the processing of referring to the revocation list, when it is confirmed that an identifier (ID) of an authentication counterpart device is registered in the revocation list, the subsequent pieces of processing are stopped. That is, processing of recording and reproducing a content is stopped.

The (a) content providing source illustrated in FIG. 1 is a providing source of contents such as music and a movie. FIG. 1 exemplifies a broadcasting station 11, a content server 12, and a content recording medium 13 such as a BD or a DVD, as the content providing source.

The broadcasting station 11 is, for example, a television station, and carries various broadcasting contents on a ground wave or a satellite wave and provides the broadcasting contents to the [(b) information processing device (content recording and reproducing device (host))] which is a user device.

The content server 12 is a server that provides contents such as music and a movie through a network such as the Internet.

The content recording medium 13 is a medium, for example, a BD-ROM and a DVD-ROM, in which a content such as a movie is recorded in advance.

A user mounts, for example, the memory card 31 on an information processing device 20, and can record, in the memory card 31, a content received by the information processing device 20 from the outside or a content reproduced from the content recording medium 13.

In addition, the information processing device 20 can read out and reproduce a content recorded in, for example, the memory card 31.

Examples of the information processing device 20 include a recording and reproducing dedicated device (CE device: Consumer Electronics device) 21 provided with a hard disk and a DVD or BD disc such as a DVD player. Furthermore, the examples of the information processing device include a PC 22 and a portable terminal 23 such as a smart phone, a mobile phone, a portable player, or a tablet terminal. All of these examples are devices designed such that the (c) information storage device 30, for example, the memory card 31 can be mounted thereon.

A use state of the memory card 31 will be described below with reference to FIG. 2.

The memory card 31 used as the information storage device 30 is a recording medium which is detachably attached to a content reproducing device such as a PC, and can be freely detached from a device which records the content and attached to another user device.

Figure 2:
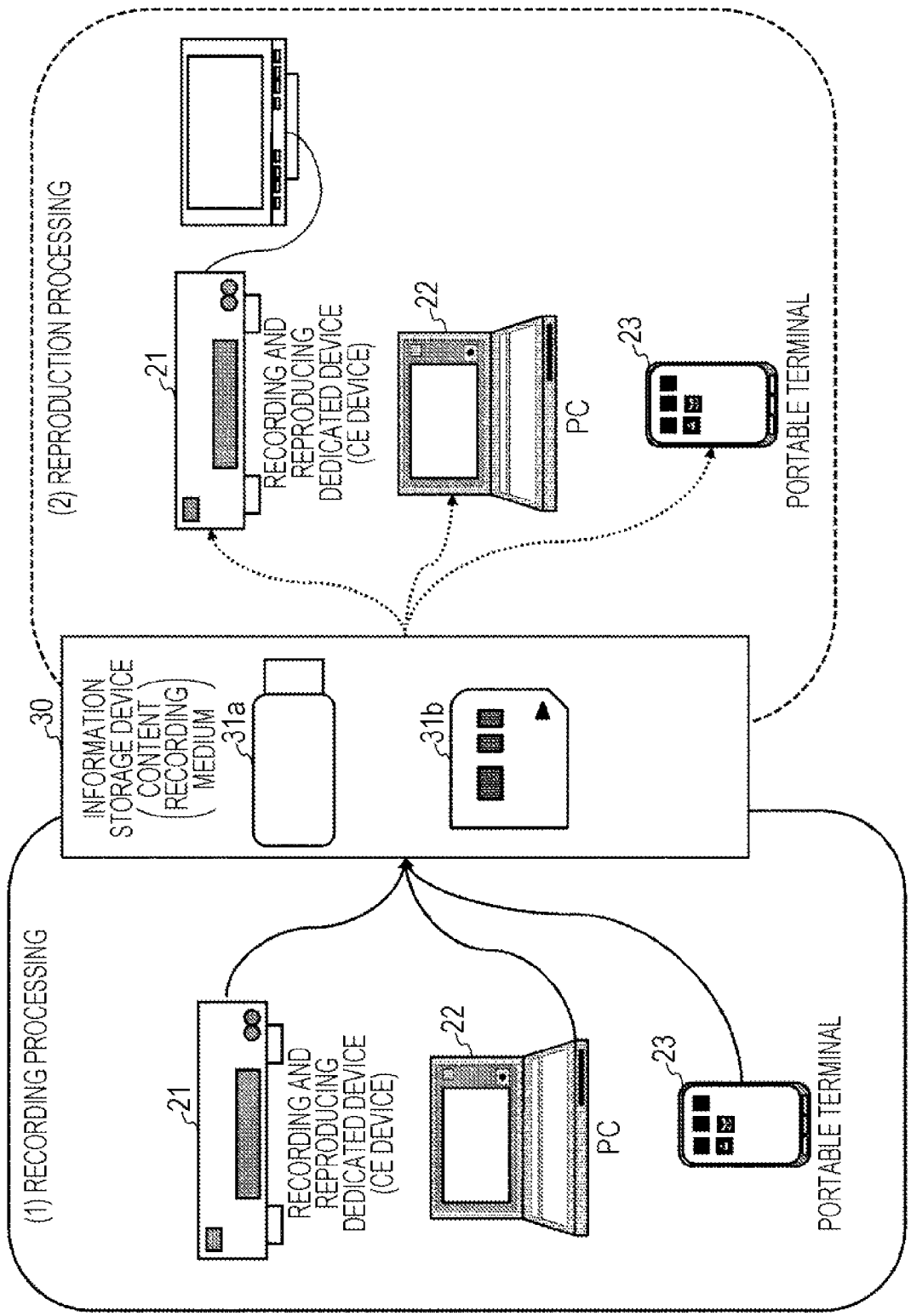
FIG. 2 is a diagram illustrating a use state of a content which is recorded in a memory card.

That is, as illustrated in FIG. 2, the following pieces of processing are executed.

(1) Recording processing
(2) Reproduction processing

Meanwhile, there is also a device which executes only one of recording and reproduction.

In addition, it is not necessary that the same device executes both the recording processing and the reproduction processing, and a user can freely select and use a recording device and a reproducing device.

Meanwhile, in many cases, the usage-controlled content recorded in the memory card 31 is recorded as encrypted content, and the content reproducing device such as the recording and reproducing dedicated device 21, the PC 22, or the portable terminal 23 executes decryption processing based on a predetermined sequence and then reproduces the content.

In addition, the content reproducing device performs reproduction processing in a use allowance state recorded in the usage control information (usage rule file) which is set corresponding to the content.

The (b) content recording and reproducing device (host) stores a content reproduction application which is a program (host application) for executing content use based on the usage control information (usage rule file) and the content decryption processing, and the content reproduction is executed based on the program (host application).

[2. With Regard to Configuration Example of Information Storage Device]

Next, a description will be given of a configuration example of an information storage device such as the memory card 31 which is used as a content recording medium.

Figure 3:
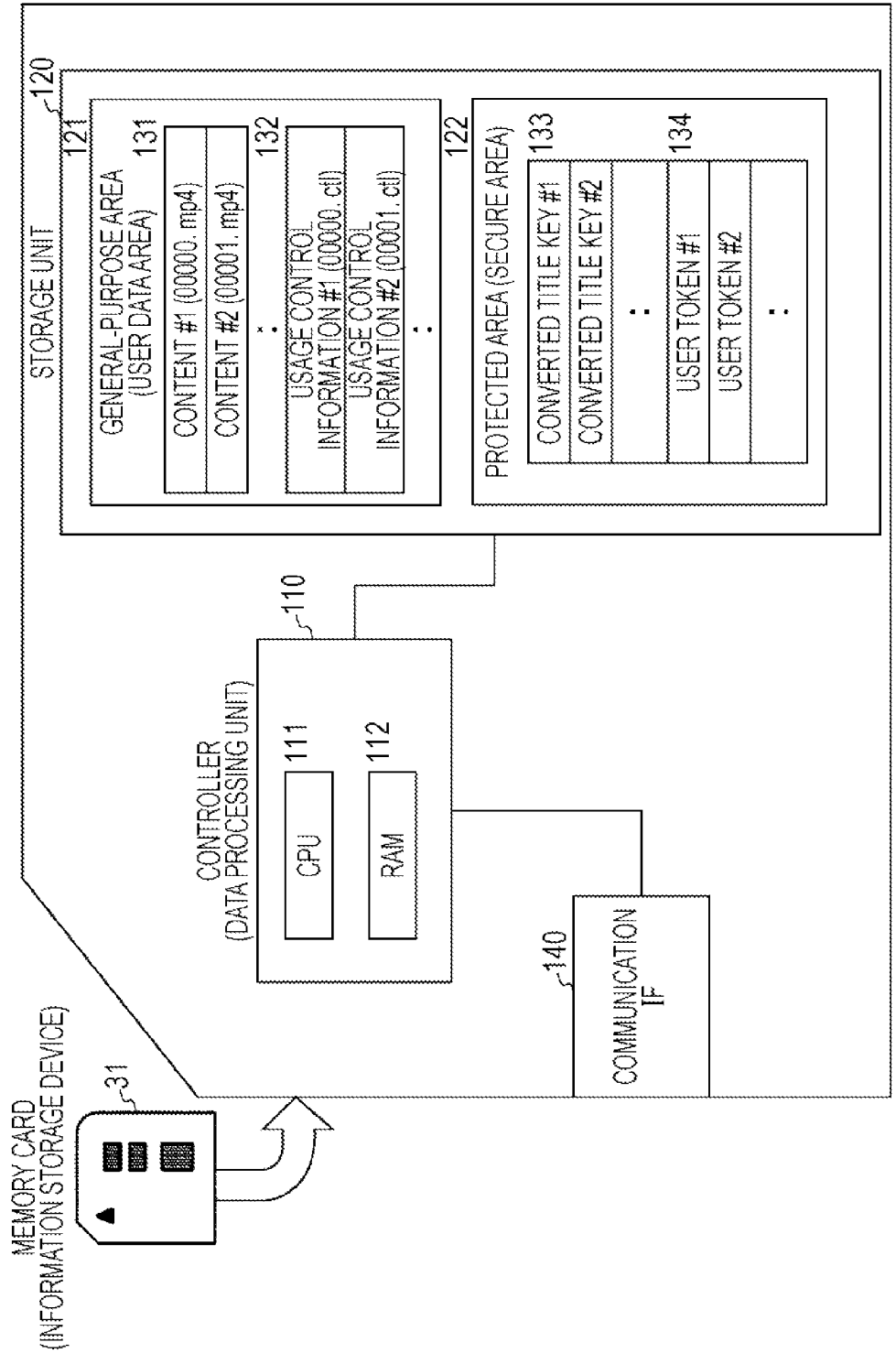
FIG. 3 is a diagram illustrating a specific configuration example of a memory card.

A specific configuration example of the memory card 31 is illustrated in FIG. 3.

The memory card 31 is mounted on, for example, the information processing device (host) 20 that records and reproduces a content, and is accessed by the information processing device 20 or a server connected thereto through the information processing device 20 so that data is read out from and is written in the memory card.

As illustrated in FIG. 3, the memory card 31 includes a controller (data processing unit) 110, a storage unit 120, and a communication IF 140.

The memory card communicates with, for example, the information processing device (host) through the communication IF 140.

The controller (data processing unit) 110 is constituted by a CPU 111 having a function of executing a program, a RAM 112, or the like. The RAM 112 is used as a recording area for a data processing program or various parameters which are executed by the CPU or for ID information and key information which are inherent in a controller.

The storage unit 120 is divided into a general-purpose area (user data area) 121 that basically allows free access, and a protected area (secure area) 122 that does not allow free access.

Meanwhile, the protected area (secure area) 122 is further divided into a plurality of blocks, and is configured such that access control can be performed in units of blocks.

In the general-purpose area (user data area) 121, a content 131 which is provided by, for example, a content server and usage control information 132 having use allowance information such as copy control information corresponding to the content recorded therein are recorded. In many cases, the content is a content which is encrypted by a title key.

The usage control information is set corresponding to a content, and is provided together with a content in many cases. For example, when a content is downloaded from a server and is recorded, a usage control information file corresponding to the downloaded content is downloaded and recorded together. A data configuration of the usage control information file will be described later.

Various pieces of secret information are recorded in the protected area (secure area) 122.

Examples of the secret information include an encryption key (title key) which is applied to the decryption of a content.

Figure 4:
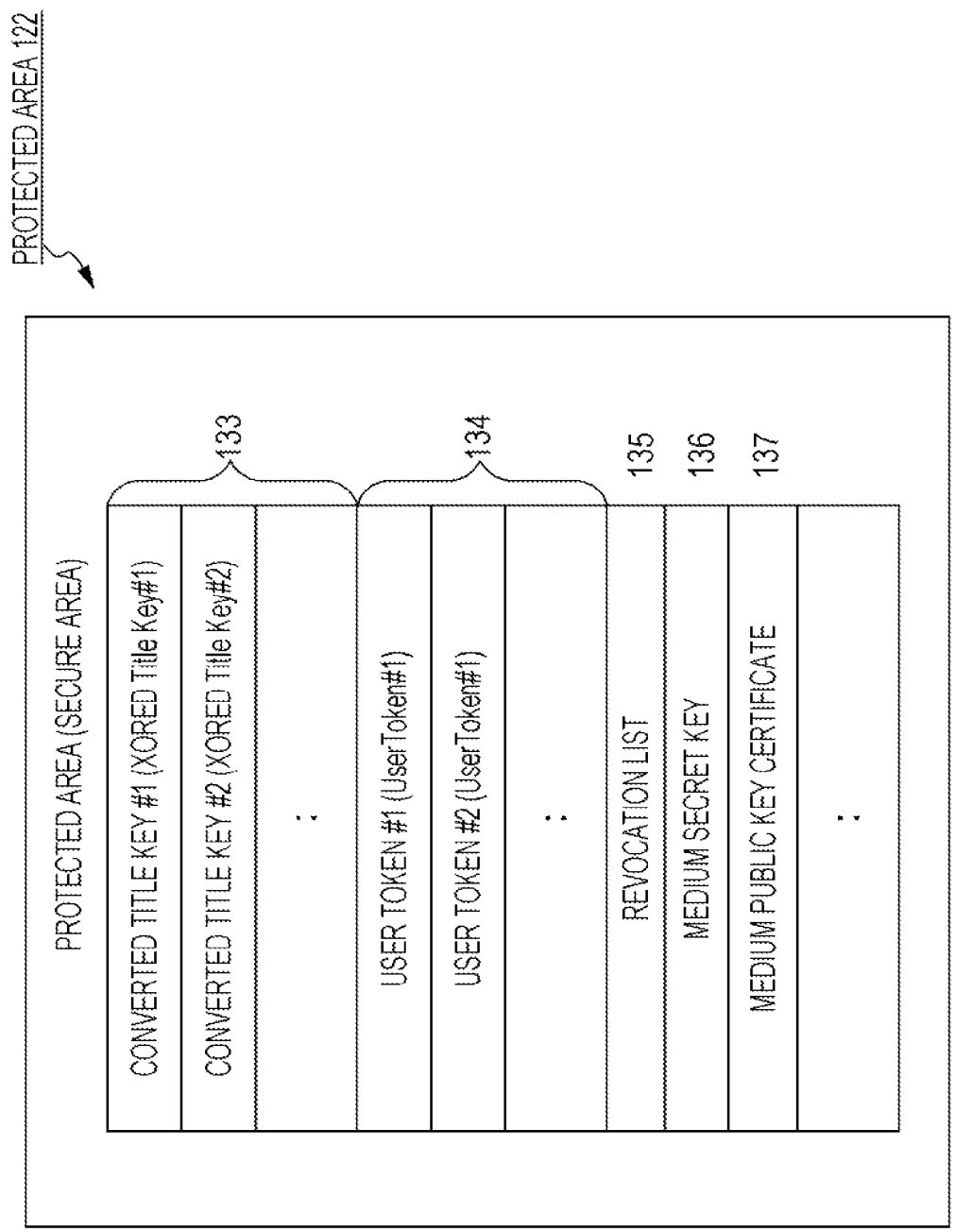
FIG. 4 is a diagram illustrating an example of stored data of a protected area of a memory card.

FIG. 4 illustrates a specific example of stored data of the protected area (secure area) 122. As illustrated in FIG. 4, the protected area (secure area) 122 stores, for example, the following pieces of data.

---
Converted title key (XORed Title Key) 133
User token (User Token) 134
Revocation list 135
Medium secret key 136
Medium public key certificate 137

---

The converted title key 133 is converted data of a title key which is an encryption key applied to encryption and decryption processing of a content recorded in the general-purpose area 121.

The title key stored in the protected area (secure area) 122 is stored as a converted title key on which predetermined data conversion is performed.

Specifically, the title key is stored as data obtained as a result of exclusive OR computation (XOR) between content-specific binding secret information (Binding Secret), which is constituted by, for example, random numbers generated by a content providing server, and the title key.

Specifically, for example, the converted title key (XORed Title Key) is calculated by following Equation 1.

$$\text{XORed Title Key} = \text{Title Key}(xor)\text{Binding Secret} \quad (1)$$

Meanwhile, A(xor)B denotes exclusive OR computation between data A and data B.

The above-mentioned equation is an equation meaning that the converted title key (XORed Title Key) is calculated by exclusive OR computation between the title key and the binding secret information (Binding Secret).

Meanwhile, Equation 1 mentioned above is an example of setting of the converted title key.

The converted title key is not limited to Equation 1 mentioned above, and may be configured to be calculated by, for example, computation processing using data including the binding secret information (Binding Secret), the usage control information (Usage Rule) corresponding to a content, and other pieces of information, or by computation processing such as exclusive OR computation (XOR).

When a content is decrypted, the converted title key stored in the protected area (secure area) 122 is acquired, predetermined computation is executed to calculate the title key, and decryption processing is executed using the calculated title key.

The user token (UserToken) 134 is encrypted data of the above-described binding secret information (Binding Secret) based on an authentication key (Kauth). That is, the user token is encrypted data based on the authentication key (Kauth) for the content-specific binding secret information (Binding Secret) which is constituted by random numbers generated by the content providing server.

Meanwhile, the authentication key (Kauth) is encryption key which is generated on the basis of data including a user ID (User ID) and a user password (User Password).

Specifically, for example, the authentication key (Kauth) is calculated by the following Equation 2.

$$\text{Kauth} = \text{func}(\text{User ID}\|\text{Password}) \quad (2)$$

Meanwhile, in Equation 2 mentioned above, (A∥B) denotes coupled data between A and B.

Here, func (A∥B) denotes application processing of a function for the coupled data between A and B.

Examples of the function func include a hash function, an encryption function, and the like. Specifically, for example, an authentication key (Kauth) is calculated with respect to coupled data between a user ID (User ID) and a user password (Password), by the following Equation 3 to which a hash function (SHA-1) is applied.

$$\text{Kauth} = \text{SHA-1}(\text{User ID}\|\text{Password}) \quad (3)$$

The authentication key (Kauth) is calculated by Equation 3 mentioned above.

Alternatively, an authentication key (Kauth) is calculated by the following Equation 4 in which encryption processing (Enc) is performed on a user ID (User ID) by using a hash value of a user password (Password) as an encryption key.

$$\text{Kauth} = \text{Enc}(\text{SHA-1}(\text{Password}), \text{User ID}) \quad (4)$$

The authentication key (Kauth) is calculated by Equation 4 mentioned above.

Meanwhile, Enc (A,B) denotes encryption processing of data B to which an encryption key A is applied.

In this manner, the authentication key (Kauth) is a key which is calculated by applying a predetermined function to the user ID (User ID) and the user password (Password).

A user token is generated by encrypting the above-described binding secret information (Binding Secret) by applying the authentication key (Kauth).

Specifically, for example, the user token (UserToken) is calculated by the following calculation equation (Equation 5).

$$\text{UserToken} = \text{Enc}(\text{Kauth}, \text{Binding Secret}\|\text{ICV}) \quad (5)$$

Equation 5 mentioned above is an equation for generating the user token (UserToken) by encryption processing in which the authentication key (Kauth) is applied to coupled data between binding secret information (Binding Secret) and a verification value (ICV: Integrity Check Value) generated on the basis of the binding secret information.

The verification value ICV is a verification value which is generated on the basis of the binding secret information, and specifically, is a verification value which is generated by, for example, any one of the following equations.

$$\text{ICV} = \text{hash}(\text{Kauth}, \text{Binding Secret}) \quad (6)$$

$$\text{ICV} = \text{SHA-1}(\text{Binding Secret}) \quad (7)$$

$$\text{ICV} = \text{MAC}(\text{Kauth}, \text{Binding Secret}) \quad (8)$$

$$\text{ICV} = \text{AES-E}(\text{Kauth}, \text{Binding Secret})\text{xor}(\text{Binding Secret}) \quad (9)$$

Meanwhile, in Equation 5 mentioned above, when encryption having the authentication key (Kauth) applied thereto is performed, a data length of data [Binding Secret∥ICV] as a target of encryption processing is required to be set to an encryption processing unit, and thus binding data having an appropriate size may be added to ICV, generated in accordance with each of the above-mentioned equations (Equations 6 to 9), to adjust the data length of ICV.

Equation 6 mentioned above is an equation in which a result of calculation processing of a hash value obtained by applying an authentication key (Kauth) to binding secret information (Binding Secret) is calculated as a verification value ICV.

Equation 7 mentioned above is an equation in which a hash value obtained by applying a hash function (SHA-1) to binding secret information (Binding Secret) is calculated as a verification value ICV.

Equation 8 mentioned above is an equation in which a message authentication code (MAC) value obtained by applying an authentication key (Kauth) to binding secret information (Binding Secret) is calculated as a verification value ICV.

Equation 9 mentioned above is an equation in which a computation result of exclusive OR (xor) between encrypted data based on an encryption function (AES-E), obtained by applying an authentication key (Kauth) to binding secret information (Binding Secret), and the binding secret information (Binding Secret) is calculated as a verification value ICV.

As described above, a user token stored in the protected area (secure area) 122 of the memory card illustrated in FIG. 4 is data which is generated on the basis of the following pieces of information.

(A) Authentication key (Kauth) which is generated by applying user ID and user password (B) Content-specific binding secret information (Binding Secret) which is generated corresponding to content That is, one user token is generated as data in which (1) a specific user who is specified by a user ID and a user password and (2) a specific content corresponding to binding secret information (Binding Secret) are coupled to each other.

In this manner, the protected area (secure area) 122 of the memory card illustrated in FIG. 4 stores a user token which is set as data inherent in both a user and a content.

The revocation list (Revocation List) 135 is a list in which an unauthorized device, specifically, a device identifier (ID) of an information processing device such as a recording and reproducing device determined to be an unauthorized device or an information storage device such as a memory card, a reproduction program which is installed in a device, and an identifier (ID) of a public key certificate (Certificate) stored in a device are registered. The revocation list (Revocation List) 135 is a list that is issued and sequentially updated by a license management device, and is configured such that a signature of the license management device is set and falsification can be verified.

The medium secret key 136 is a secret key corresponding to the memory card 31 according to a public key encryption system, and the medium public key certificate 137 is a certificate (Certificate) storing a public key corresponding thereto.

Meanwhile, the protected area 122 also stores, for example, the revocation list 135, the medium secret key 136, and a public key of the license management device which is an issuer of the medium public key certificate. This key is used, for example, at the time of processing of verifying a signature which is set in the revocation list 135 or processing of verifying a signature that is set in the public key certificate.

[3. With Regard to Example of Data Configuration of Usage Control Information]

Figure 5:
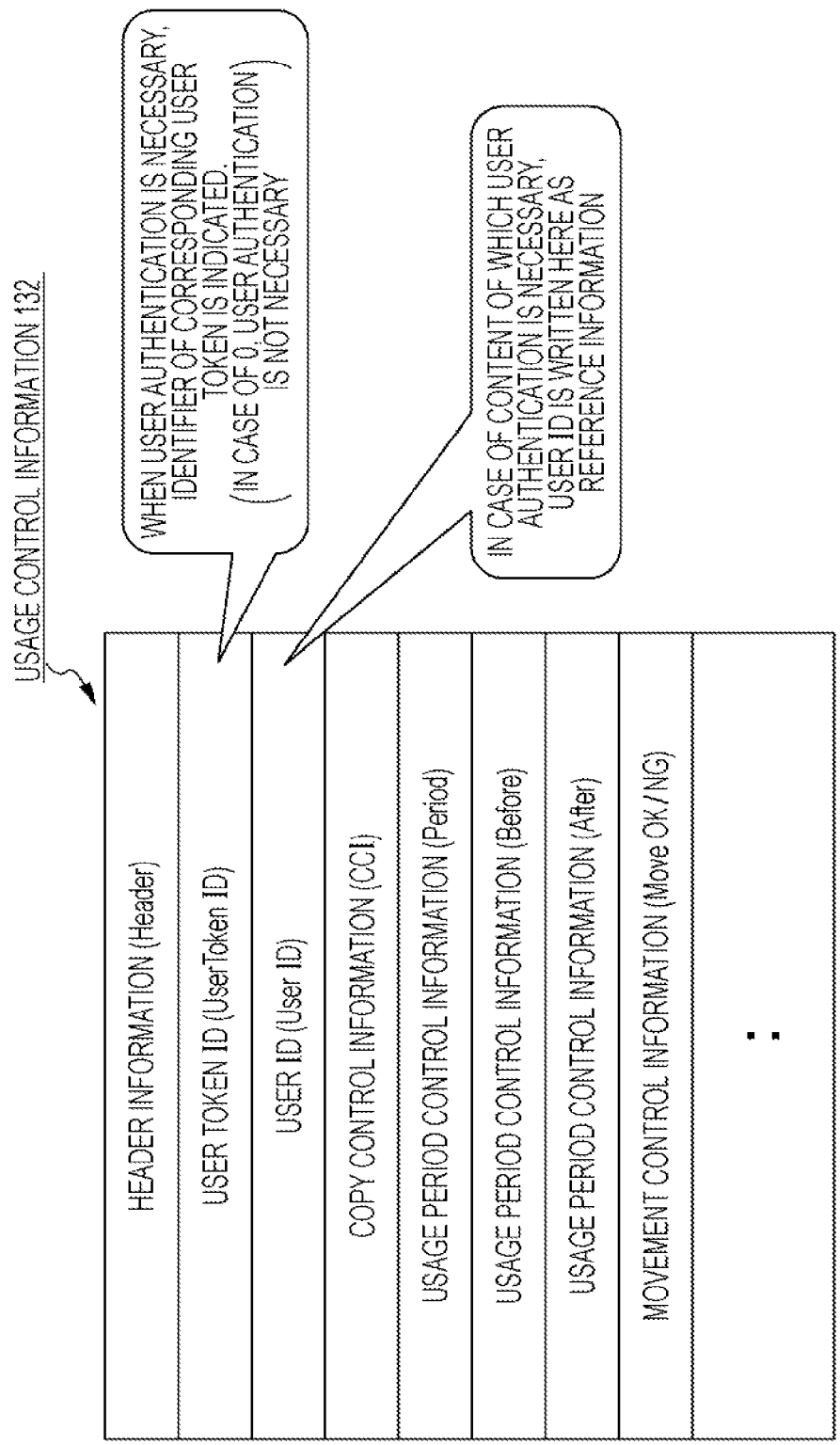
FIG. 5 is a diagram illustrating an example of a data configuration of usage control information (Usage Rule).

FIG. 5 illustrates an example of a data configuration of the usage control information 132 which is recorded in the general-purpose area 121 of the memory card 31.

As described above, use allowance information such as copy control information corresponding to a content is recorded in the usage control information 132. Specifically, as illustrated in FIG. 5, for example, the usage control information has the following pieces of data.

Header information (Header)
User token ID (UserToken ID)
User ID (User ID)
Copy control information (CCI: Copy Control Information)
Use period control information (Period)
Use period control information (before)
Use period control information (After)
Movement control information (Move OK/NG)
For example, these pieces of information are recorded.

Identification information indicating usage control information and an identifier of the corresponding content are recorded in the header information (Header).

A user token ID (UserToken ID) and a user ID (User ID) are pieces of data that are recorded in a case where a content as a target of usage control based on the usage control information is a content that is specified as a condition of content reproduction on the establishment of user authentication.

In a case where the content is a content that is not specified as a condition of content reproduction on the establishment of user authentication, invalid data (NULL), for example, data such as all zero is recorded in a setting field of the user token ID (UserToken ID) or the user ID (User ID).

When a valid user token ID (UserToken ID) and user ID (User ID) are recorded in usage control information (Usage Rule), a reproducing device executes user authentication processing by applying these pieces of information. Content reproduction is allowed on condition that the establishment of user authentication has been confirmed.

When user authentication has not been established, content reproduction is not allowed.

The user authentication processing will be described later in detail.

The user token ID (UserToken ID) is an identifier (ID) of a user token that is set corresponding to a content to which the usage control information is to be applied.

The user ID (User ID) is an identifier (ID) corresponding to an authorized user who is permitted to use a content to which the usage control information is to be applied.

Meanwhile, the user ID is consistent with a user ID used to generate an authentication key (Kauth) which is used to generate a user token.

The user authentication processing using these pieces of data will be described later in detail.

The copy control information is information indicating whether a content is allowed to be copied and indicating the restriction of the number of copying operations when the content is permitted to be copied.

The use period control information is information indicating data and time when a content is allowed to be used. The use period control information is recorded as information such as a certain period, before a certain time and date, or after a certain time and date.

The movement control information (Move OK/NG) is information indicating whether a content is allowed to move to an external device.

In addition, various pieces of information, such as identification information of a title key to be applied to the decryption of a content or a converted title key, which are necessary to decrypt and reproduce a content, are recorded in the usage control information file.

The various pieces of information are recorded in the usage control information file corresponding to a content, and when a user device such as a reproducing device reproduces a content and performs copying, the user device acquires necessary information in accordance with control information recorded in the usage control information corresponding to a content, and reproduces and copies a content in a range based on the control information recorded in the usage control information.

[4. With Regard to Access Control with Respect to Protected Area of Memory Card Based on Certificate]

First, as described above with reference to FIG. 3 and the like, access to the protected area of the memory card is limited. That is, when data is written in the protected area (secure area) 122 of the storage unit 120 of the memory card 31 illustrated in FIG. 3 or data is read out from the protected area (secure area) 122, the memory card executes processing of confirming an access right of an external device that attempts to perform these pieces of processing, and allows access only to a host of an external device, such as a server or a reproducing device, for which an access right is confirmed.

The processing of confirming an access right is executed on the basis of a certificate which is provided to a memory card by a device or application which attempts to have access to the protected area.

A data processing unit of the memory card acquires a device certificate (server certificate or host certificate) from a device attempting access, and executes processing of confirming an access right in accordance with entries in the certificate.

An example of a data configuration of a device certificate owned by a device (server or host (reproducing device), or application) which attempts to have access to a protected area will be described with reference to FIG. 6.

Figure 6:
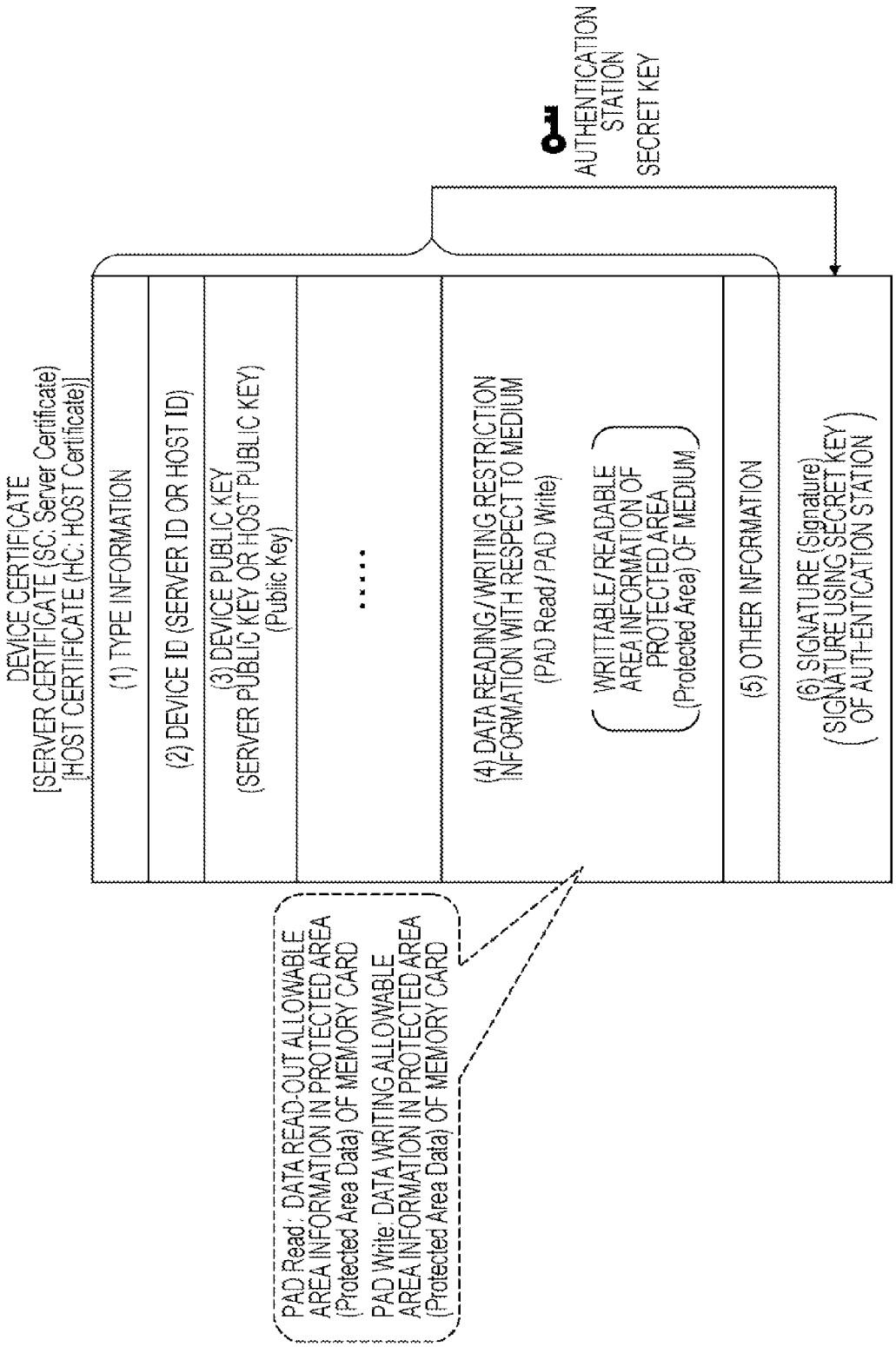
FIG. 6 is a diagram illustrating an example of a data configuration of a device certificate (Certificate).

FIG. 6 is an example of a data configuration of a device certificate.

Meanwhile, these device certificates are public key certificates that store a public key to be provided to each device by an authentication station.

With regard to the device certificate, a signature is set by a secret key of the authentication station, and the device certificate is configured as data of which the falsification is prevented.

As illustrated in FIG. 6, the device certificate includes the following pieces of data.

(1) Type information
(2) Device ID (server ID, host ID, application ID, or the like)
(3) Device public key (Public Key)
(4) Reading/writing restriction information (PAD Read/PAD Write) in units of blocks in protected area of medium (memory card)
(5) Other information
(6) Signature Hereinafter, the pieces of data (1) to (6) mentioned above will be described.

(1) Type Information

The type information is information indicating a type of a certificate or a type of a content server. For example, the type information is data indicating that the certificate is a server certificate or a host certificate, or the type information is a type of a server, for example, a server providing a music content or a server providing a movie content. Alternatively, information indicating a type of a host, for example, a reproduction dedicated device or a type of a device such as a device performing reproduction and recording is recorded.

(2) Device ID

The device ID is an area where a server ID as server identification information and a host ID as a host identifier are recorded.

(3) Device Public Key (Public Key)

The device public key (Public Key) is a public key of a device (server or host). The device public key and a secret key that is provided to each device constitute a key pair based on a public key encryption system.

(4) Reading/Writing Restriction Information (PAD Read/PAD Write) in Units of Blocks in Protected Area of Medium (Memory Card)

In the reading/writing restriction information (PAD Read/PAD Write) for a medium, information is recorded which indicates whether access can be performed in units of divided blocks within the protected area 122 that is set in a storage unit of a medium recording a content, for example, the memory card 31 illustrated in FIG. 3.

That is, information on a block for which data reading (Read) and data writing (Write) are allowed is recorded. Meanwhile, the block within the protected area 122 of the memory card is also referred to as a PAD block.

The memory card determines whether to permit writing and reading in units of blocks within the protected area 122 illustrated in FIG. 3, with reference to, for example, a recording field of a server certificate illustrated in FIG. 6 which is received from a server in a step of authentication processing, and allows only permitted processing to be executed in a permitted divided area.

As illustrated in FIG. 6, in the device certificate, [(5) Other information] are recorded as well as the above-described data, and (6) signature, generated by a secret key of an authentication station, for each of the pieces of data (1) to (5) is recorded. A configuration in which falsification is prevented by the signature is realized.

When the server certificate (Server Certificate) is used, signature verification is executed to confirm the validity of the server certificate (Server Certificate), and then the server certificate is used. Meanwhile, the signature verification is executed using the public key of the authentication station.

A host such as a server, a recording device, or a reproducing device which requests access to a protected area of a memory card holds a device certificate in which reading/writing restriction information (PAD Read/PAD Write) for the medium illustrated in (4) of FIG. 6 is recorded, and shows the device certificate to the memory card to be subjected to determination for confirming an access right.

The memory card performs signature verification of the certificate shown from the access requesting device to confirm the validity of the certificate, determines the permission of writing and reading in units of blocks which are divided areas within the protected area 122 illustrated in FIG. 3, with reference to the reading/writing restriction information (PAD Read/PAD Write) recorded in the certificate, and allows only permitted processing to be executed in a permitted block area.

As described above, the reading/writing restriction information (PAD Read/PAD Write) for the medium is set, for example, in units of devices which attempt to access the content, for example, in units of content servers or recording and reproducing devices (hosts). The pieces of information are recorded in the server certificate (Server Cert) or host certificate (Host Cert) corresponding to each device.

The memory card 31 verifies recorded data of the server certificate (Server Cert) or host certificate (Host Cert) in accordance with a specified program stored in advance in the memory card 31, and performs of allowing access to only an area for which access is permitted.

Figure 7:
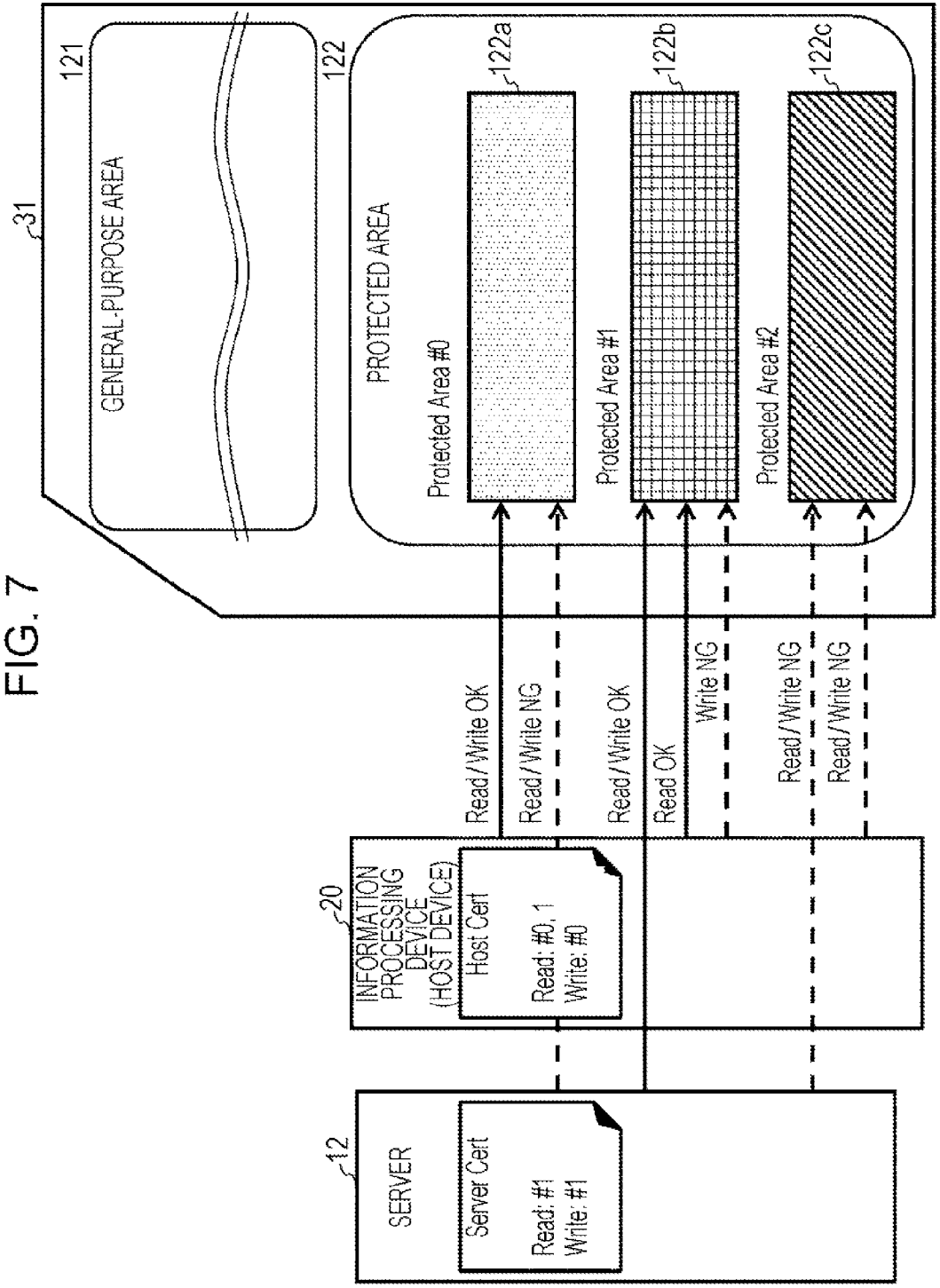
FIG. 7 is a diagram illustrating an example of access control to a protected area of a memory card.

Referring to FIG. 7, a description will be given of examples in which access restriction is set in a case where a device requesting access to a memory card is a server and a case where the device is a host device such as a recording and reproducing device.

FIG. 7 illustrates the content server 12 which is a device requesting access to a memory card, the information processing device (host device) 20 such as a PC which is equipped with a memory card to perform recording and reproduction of a content, and the memory card 31, in this order from the left of the drawing.

The content server 12 is a server that executes, for example, processing of providing a content or processing of writing an encryption key to be applied to the decryption of a content.

The information processing device (host device) 20 is a device that reproduces a content stored in the memory card 31, and is a device required to acquire an encryption key recorded in the memory card in order to perform decryption processing of a content.

The memory card 31 includes the protected area 122 and the general-purpose area 121, and an encrypted content and the like are recorded in the general-purpose area 121.

Secret information required to be applied to the decryption of an encrypted content is recorded in the protected area 122.

The protected area 122 is divided into a plurality of blocks (PAD blocks).

FIG. 7 illustrates an example in which the protected area has the following three blocks.

---

Block #0 (Protected Area#0) 122a
Block #1 (Protected Area#1) 122b
Block #2 (Protected Area#2) 122c

---

In a step of authentication processing with the access requesting device, the memory card 31 receives a device certificate (for example, server certificate (Server Cert)) such as a public key certificate from a counterpart device, that is, the access requesting device, and determines whether access to each block of the protected area 122 is allowed, using information described in the certificate. As a result of the determination, only permitted processing is executed in a permitted block.

For example, writing allowance area information (PAD Write) recorded in a server certificate of a server is configured as a certificate in which writing (Write) permission for the PAD block #1 (Protected Area #1) 122b is set. That is, as illustrated in the drawing, the setting is configured as follows.

Reading (Read) allowance area: block #1
Writing (Write) allowance area: block #1

Meanwhile, in the example illustrated in the drawing, a block for which writing (Write) is allowed is also set to be allowed for reading (Read).

In addition, a host certificate held by the information processing device (host device) 20 as a reproducing device that reads an encryption key recorded in, for example, the block #1 (Protected Area#1) 122b and reproduces a content is a certificate having the following setting.

Permission of reading (Read) and writing (Write) with respect to the block #0 (Protected Area#0) 122a

Permission of reading (Read) with respect to the block #1 (Protected Area#1) 122b

The host certificate is a certificate in which these pieces of permission information are set.

That is, as illustrated in the drawing, the host certificate is a certificate having the following setting.

Reading (Read) allowance area: block #0, 1
Writing (Write) allowance area: block #0

Writing (Write) permission for the block #1 (Protected Area#1) 122b within the protected area is not set in the host certificate.

However, at the time of deleting a content, in order for an encryption key corresponding to the deleted content to be capable of being deleted, the setting may be made such that deletion processing is permitted.

The block #2 (Protected Area#2) 122c within the protected area is set as an area which both a server and a host are not allowed to access, that is, as an external access prohibition area.

That is, the block #2 (Protected Area#2) 122c is set as an area which a data processing unit within the memory card 31 accesses (data writing and reading), only when data processing is executed within the memory card 31.

In this manner, the data processing unit of the memory card determines whether to permit data writing and data reading for the protected area 122 from the access requesting device, in units of blocks on the basis of the device certificate.

[5. With Regard to Content Downloading and Sequence of Recording Processing with Respect to Information Storage Device]

Next, a description will be given of processing in which the information processing device (host) equipped with a memory card has access to a content providing server, downloads a content provided by a server, and records the content in the memory card.

Figure 8:
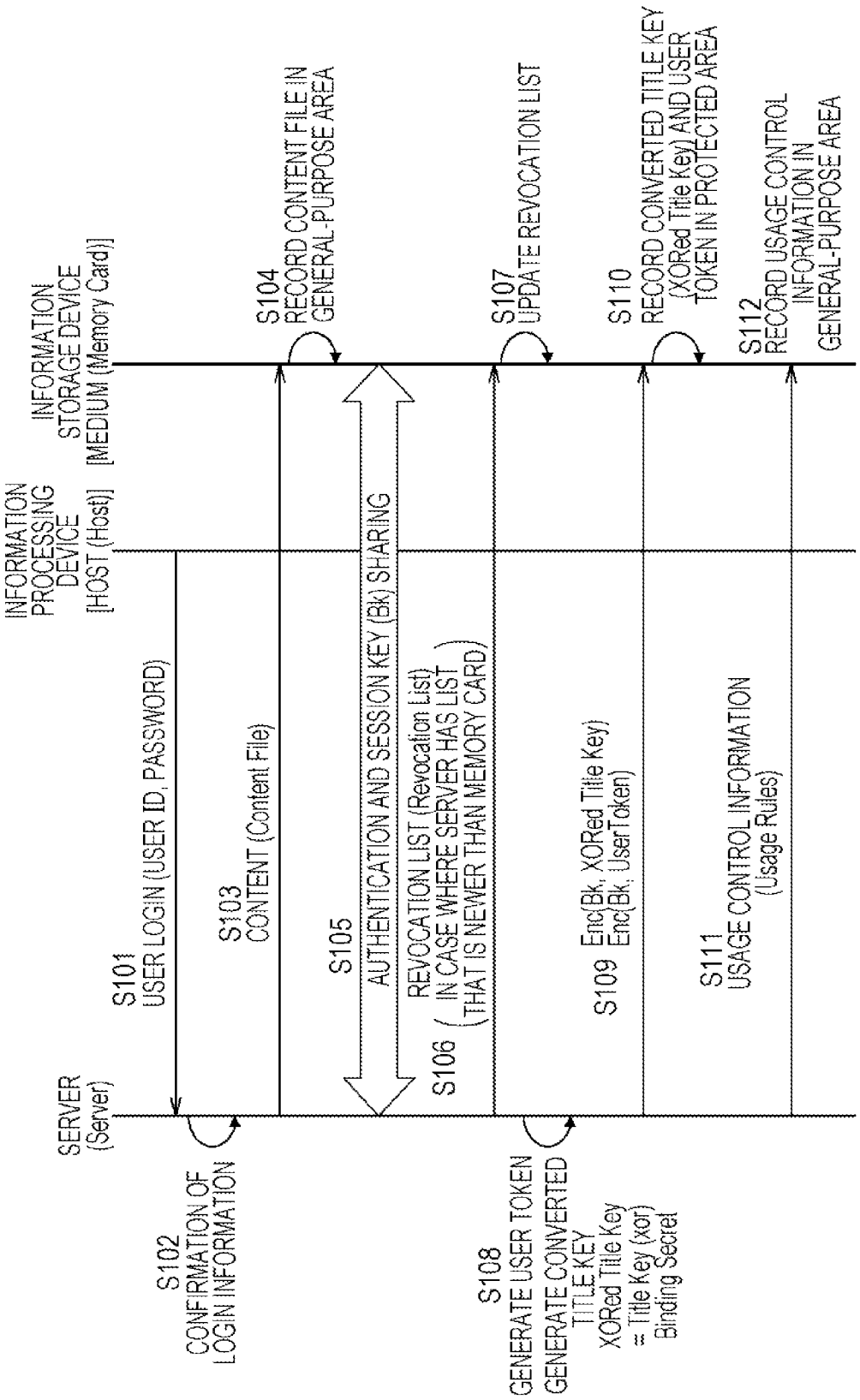
FIG. 8 is a diagram illustrating a sequence of downloading and recording processing of a content.

FIG. 8 is a diagram illustrating a processing sequence at the time of recording a content downloaded from a server in an information storage device which is a medium such as a memory card.

FIG. 8 illustrates the following components, from the left of the drawing.

(a) Server that executes processing of providing content
(b) Information processing device (host) equipped with information storage device (medium) such as memory card
(c) Information storage device (medium) such as memory card which is recording destination of content The information processing device (host) is a reproducing device which is equipped with an information storage device (medium) such as a memory card and is capable of reproducing a content recorded in the information storage device (medium). In the information processing device (host), a storage unit stores the host certificate (Host Cert) having the data configuration described above with reference to FIG. 6.

The information storage device is the memory card 31 having the configuration described above with reference to, for example, FIG. 3 and the like, and includes the controller 110 that functions as a data processing unit executing data processing, the storage unit 120, and the like.

Meanwhile, the information processing device (host) is equipped with an information storage device (medium) such as a memory card. Data processing units of the information processing device (host) and the information storage device (medium) communicate with a server and sequentially execute processing of step S101 and the subsequent pieces of processing which are illustrated in the drawing, thereby executing pieces of processing of downloading and recording a content.

Hereinafter, the processing of step S101 and the subsequent pieces of processing will be described in detail.

(Step S101)

First, an information processing device (host) equipped with an information storage device (medium), such as a memory card, which serves as a recording medium of a downloaded content transmits a user ID (User ID) and a password (Password) which are input by a user to a server, as user login processing.

The user ID and the password are information for generating the above-described authentication key (Kauth). That is, as described above, the authentication key (Kauth) is generated by the following Equation 2 to which the user ID (User ID) and the password (Password) are applied.

$$\text{Kauth}=\text{func}(\text{User ID}\|\text{Password}) \qquad (2)$$

(Step S102)

Next, the server confirms whether the user ID (User ID) and the password (Password) received from the information processing device (host) are consistent with a user ID and a password of an authorized user which are registered in advance in the server, that is, executes processing of verifying login information.

When the user ID (User ID) and the password (Password) received from the information processing device (host) are consistent with the user ID and the password of the authorized user which are registered in advance in the server, the processing of step S103 and the subsequent pieces of processing are executed.

In a case of inconsistency, the processing of step S103 and the subsequent pieces of processing are not executed, and the information processing device is notified that login information is incorrect.

(Step S103)

When the user ID (User ID) and the password (Password) received from the information processing device (host) are consistent with the user ID and the password of the authorized user which are registered in advance in the server, in step S103, the server transmits a content to the information storage device.

Meanwhile, as a premise of this processing, for example, processing is executed in which a user operating the information processing device has access to the server, a list of contents provided by the server is displayed on a display of the information processing device, and the user selects a downloaded content.

The server transmits a content in accordance with a user's designation.

Meanwhile, the transmitted content is an encrypted content which is encrypted by a title key corresponding to the content. The title key is an encryption key which is generated by the server, as an encryption key corresponding to the content.

(Step S104)

In step S104, the encrypted content transmitted from the server is recorded in a general-purpose area (user data area) of the information storage device.

Meanwhile, the content cannot be reproduced and used only by acquiring the encrypted content. It is necessary to acquire the title key which is the encryption key corresponding to the encrypted content.

(Step S105)

In step S105, mutual authentication processing and processing of sharing a session key (=bus key: Bk) are executed between the server and the information storage device. These pieces of processing are mutual authentication processing and key sharing processing based on a public key encryption system, and processing of confirming the reliability of both the server and the information storage device and processing of generating and sharing the session key (=bus key: Bk) are performed.

Specifically, each device verifies a signature of a public key certificate of a counterpart, and confirms that a device ID recorded in the public key certificate is not recorded in a revocation list.

When the signature verification fails or when the device ID is registered in the revocation list, the subsequent pieces of processing are not executed. That is, processing of providing or recording a content is not executed.

(Step S106 to Step S107)

In step S106 to step S107, processing of synchronizing the revocation list is executed. That is, when a version of the revocation list stored in the information storage device is older than a version of a revocation list held by the server, a new revocation list is provided to the information storage device from the server, and updating processing of replacing the old revocation list stored in the information storage device with the new revocation list is performed.

(Step S108)

Next, in step S108, the server generates the following pieces of data.

(1) User token (UserToken)
(2) Converted title key

As described above, the user token (UserToken) is generated on the basis of content-specific binding secret information (Binding Secret), constituted by random numbers generated by a content providing server, and an authentication key (Kauth). Specifically, the user token is calculated by the following calculation equation (Equation 5) described above.

$$\text{UserToken}=\text{Enc}(\text{Kauth},\text{Binding Secret}\|\text{ICV}) \qquad (5)$$

As described above, the authentication key (Kauth) is a key which is calculated by applying a predetermined function to a user ID (User ID) and a user password (Password).

In this manner, the user token (UserToken) calculated by the calculation equation (Equation 5) mentioned above is data which is generated on the basis of the following pieces of information.

(A) Authentication key (Kauth) generated by applying user ID and user password
(B) Content-specific binding secret information (Binding Secret) generated corresponding to content Furthermore, in step S108, the server generates a converted title key (XORed Title Key).

The converted title key (XORed Title Key) is converted data of the title key which is a key to be applied to the decryption processing of the encrypted content stored in the information storage device in step S103.

As described above, the converted title key (XORed Title Key) is generated by, for example, exclusive OR computation (XOR) between the content-specific binding secret information (Binding Secret), constituted by random numbers generated by a content providing server, and the title key. Specifically, the converted title key is calculated by the following Equation 1 mentioned above.

$$\text{XORed Title Key}=\text{Title Key}(\text{xor})\text{Binding Secret} \qquad (1)$$

(Step S109)

In step S109, the server transmits, to the information storage device (medium), the pieces of data generated in step S108, that is, (1) user token (UserToken) and (2) converted title key. Meanwhile, these pieces of data are encrypted using the session key (Bk) generated in step S105 and are transmitted.

(Step S110)

Next, the information storage device records, in a protected area (secure area), the pieces of data, that is, (1) user token (UserToken) and (2) converted title key, which are received from the server in step S109.

That is, these pieces of data are set to the stored data of the protected area 122 described above with reference to FIG. 4.

Meanwhile, a subject executing processing of writing these pieces of data in a protected area (secure area) is the server. The server executes the data writing processing on condition that the server has an access right (writing right) to a block of the protected area (secure area) of the information storage device that records these pieces of data.

Processing of confirming whether to have the access right (writing right) is executed on the basis of the server certificate (Server Certificate) described above with reference to FIG. 6. In addition, the confirmation processing is executed in the data processing unit of the information storage device.

(Step S111)

First, in step S111, the server transmits, to the information storage device, usage control information (Usage Rule) corresponding to the encrypted content transmitted in step S103.

The usage control information (Usage Rule) is a data file having the data configuration described above with reference to FIG. 5.

As described above with reference to FIG. 5, when the content transmitted in step S103 is a content requiring user authentication processing as a condition of content reproduction, the following pieces of data are recorded in the usage control information (Usage Rule).

(1) User token ID
(2) User ID

When these pieces of data are recorded, in a case where a content corresponding to the usage control information (Usage Rule), that is, the content which is transmitted to the information storage device from the server and is stored in the general-purpose area of the information storage device in step S103 is reproduced, user authentication processing is performed, and content reproduction is allowed only when user authentication is established.

This processing will be described later in detail.

(Step S112)

Next, in step S112, the information storage device records, in the general-purpose area (user data area), the usage control information (Usage Rule) received from the server.

Based on the sequence illustrated in FIG. 8, the pieces of data, that is, (1) encrypted content and (2) usage control information, which are provided from the server, are recorded in the general-purpose area of the information storage device. The pieces of data, that is, (3) converted title key (XORed Title Key) and (4) user token (UserToken), which are provided from the server, are stored in the protected area of the information storage device.

[6. With Regard to Processing of Reproducing Content Stored in Medium]

Next, referring to FIGS. 9 and 10, a sequence will be described in which an information processing device (host) reads out, decrypts, and reproduces an encrypted content stored in an information storage device such as a memory card by the content downloading processing described above with reference to FIG. 8.

Figure 9:
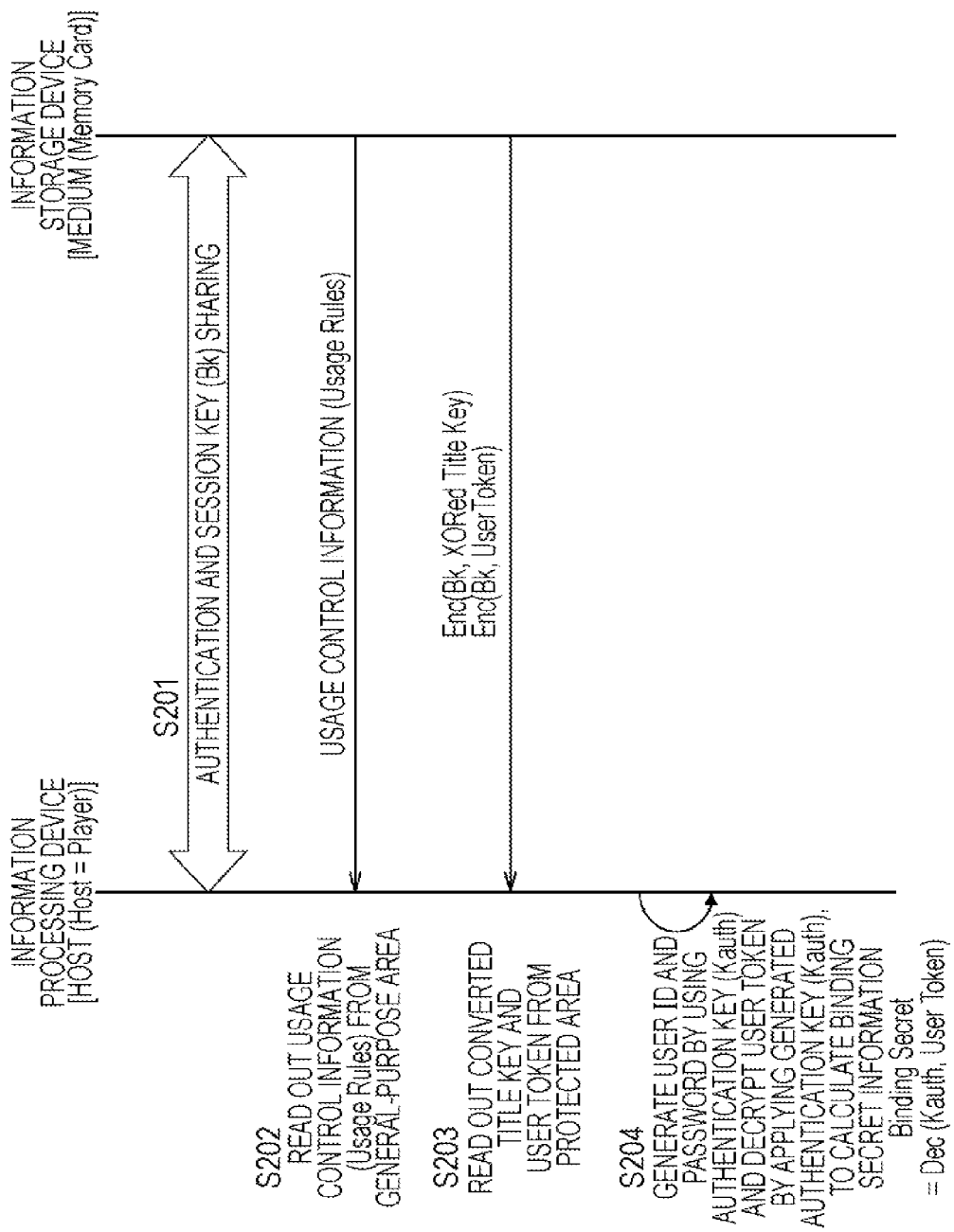
FIG. 9 is a diagram illustrating a sequence of reproduction processing of a content.
Figure 10:
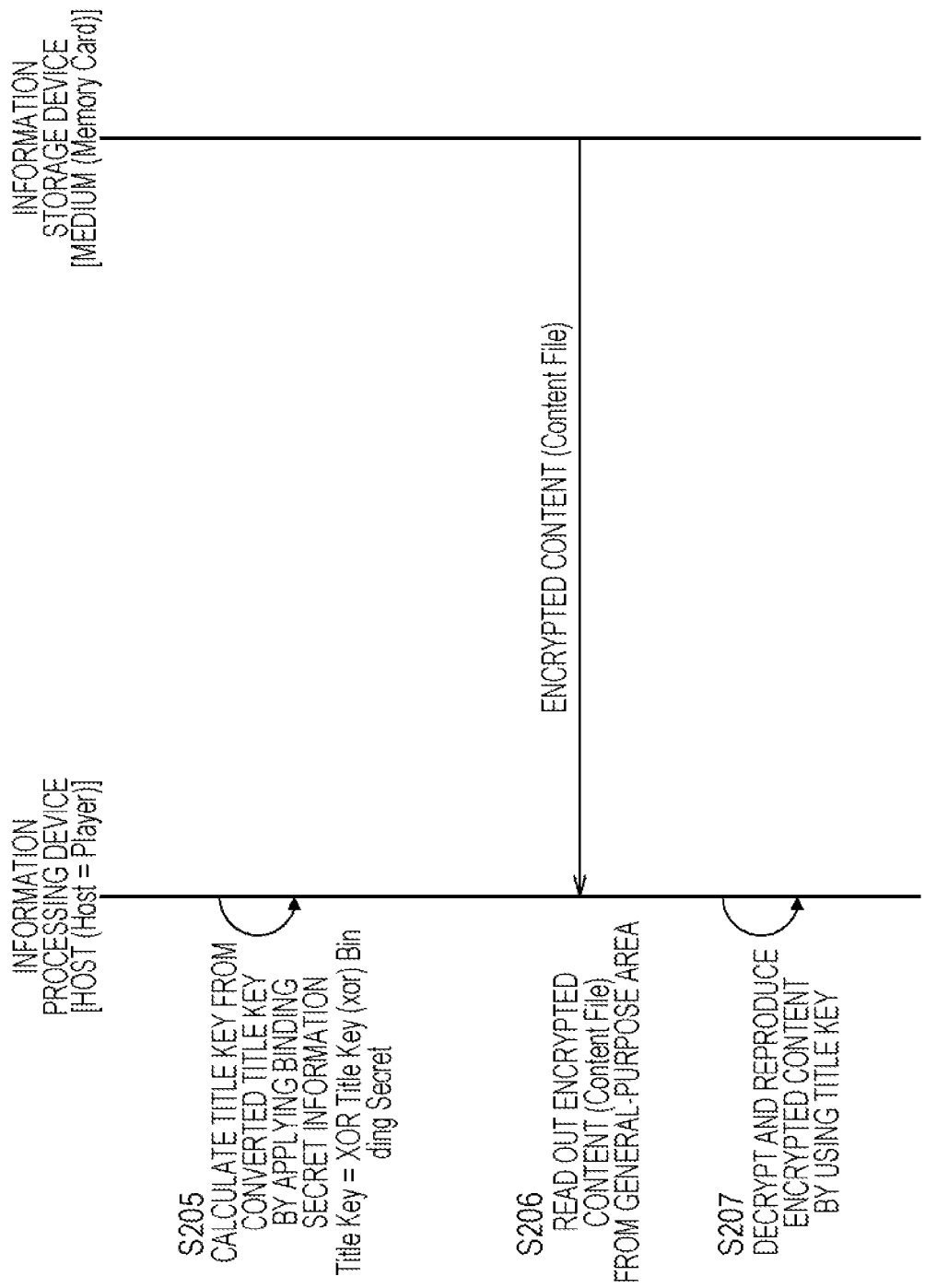
FIG. 10 is a diagram illustrating a sequence of reproduction processing of a content.

FIGS. 9 and 10 illustrate the following devices.

(1) Information processing device [host (Host=Player)] that executes content reproduction processing
(2) Information storage device [media (Memory Card)] that stores content Processing of step S201 and the subsequent pieces of processing which are illustrated in FIG. 9 are sequentially executed to reproduce a content. Hereinafter, pieces of processing of the respective steps will be described.

(Step S201)

First, mutual authentication processing and processing of sharing a session key (=bus key: Bk) are executed between the information processing device executing content reproduction processing and the information storage device that stores a content. These pieces of processing are mutual authentication processing and key sharing processing based on a public key encryption system, and processing of confirming the reliability of both the information processing device and the information storage device and processing of generating and sharing the session key (=bus key: Bk) are performed.

(Step S202)

When mutual authentication is established and it is confirmed that both the devices are reliable devices, subsequently in step S202, the information processing device performs processing of reading out usage control information (Usage Rule) stored in the general-purpose area of the information storage device.

The usage control information (Usage Rule) is information storing the data described above with reference to FIG. 5.

Meanwhile, herein, it is assumed that a content to be reproduced which corresponds to the read-out usage control information (Usage Rule) is a content conditioning reproduction on the establishment of user authentication.

Therefore, the following pieces of data described above with reference to FIG. 5 are recorded in the usage control information (Usage Rule).

(1) User token ID
(2) User ID

The user token ID (UserToken ID) is an identifier (ID) of a user token which is set corresponding to a content to which the usage control information is to be applied.

The user ID (User ID) is an identifier (ID) corresponding to an authorized user who is permitted to use a content to which the usage control information is to be applied.

Meanwhile, the user ID is consistent with a user ID used to generate an authentication key (Kauth) which is used to generate the user token.

(Step S203)

Next, in step S203, the information processing device executes processing of reading out the following pieces of data from a protected area of the information storage device, in accordance with information recorded in the usage control information (Usage Rule).

(1) Converted title key (XORed Title Key)
(2) User token (UserToken)

These pieces of data are read out from the protected area of the information storage device. Meanwhile, the pieces of data are encrypted using the session key (Bk) generated in step S201 and are read out.

These pieces of data, that is, (1) converted title key (XORed Title Key) and (2) user token (UserToken) are pieces of data that are transmitted to the information storage device from the server in step S109 of the above-described sequence diagram of FIG. 8 and are stored in the protected area of the information storage device.

Meanwhile, at the time of processing of reading out data from the protected area, the data processing unit of the information storage device executes processing of determining whether the information processing device has an access right to a data storage area of the protected area. The determination processing is performed with reference to information recorded in a device certificate which is received from, for example, the information processing device by the information storage device, that is, the host certificate (Host Certificate) storing the public key which is described above with reference to FIG. 6.

In the determination processing, only when it is determined that the information processing device has an access right to a storage area of a converted title key and a user token which is the protected area, the converted title key and the user token are read out in step S203.

When it is determined that the information processing device does not have an access right to the storage area of the converted title key and the user token which is the protected area, data is not read out in step S203. In this case, a content is not reproduced.

(Step S204)

Next, in step S204, the information processing device generates an authentication key (Kauth) using a user ID and a password, and decrypts the user token by applying the generated authentication key (Kauth) and calculates binding secret information.

First, the information processing device outputs display for requesting inputs of a user ID and a password, and a user inputs the user ID and the password.

Meanwhile, the user ID and the password may be stored in advance in the information processing device or a memory of the information storage device without a user's input and may be read out.

That is, a configuration may be made such that the user ID and the password recorded in advance in a memory capable of being accessed by a content reproduction processing application, executing the processing based on FIGS. 9 and 10, are read out and that the read-out data is used.

Next, an authentication key (Kauth) is generated by applying the acquired user ID (User ID) and password (Password). As described above, the authentication key (Kauth) is calculated by the following Equation 2.

$$Kauth=func(User\ ID\|Password) \quad (2)$$

Next, the user token (UserToken) is decrypted by applying the generated authentication key (Kauth) to acquire binding secret information (Binding Secret).

As described above, the user token (UserToken) is data which is generated by the following calculation equation (Equation 5).

$$UserToken=Enc(Kauth,Binding\ Secret\|ICV) \quad (5)$$

That is, encrypted data based on the authentication key (Kauth) for the binding secret information (Binding Secret) is a user token (UserToken).

Therefore, it is possible to acquire the binding secret information (Binding Secret) by decryption processing based on the authentication key (Kauth) for the user token (UserToken).

That is, the binding secret information (Binding Secret) is acquired by the following Equation 10.

$$(Binding\ Secret\|ICV)=Dec(Kauth,UserToken) \quad (10)$$

Meanwhile, Dec(A,B) denotes decryption processing to which a key A for data B is applied.

Equation 5 mentioned above is set such that the user token (UserToken) is generated on the basis of an authentication key (Kauth) for coupled data between the binding secret information (Binding Secret) and the verification value (ICV) thereof.

Therefore, when decryption processing based on the authentication key (Kauth) according to Equation 10 is performed, coupled data between the binding secret information (Binding Secret) and the verification value (ICV) thereof, that is, the following data is obtained.

Binding Secret∥ICV

The information processing device executes verification processing of the calculated binding secret information (Binding Secret) on the basis of the data. That is, verification processing having the verification value (ICV) applied thereto is executed.

Specifically, for example, when the verification value (ICV) is a correct binding secret information (Binding Secret) hash value, the hash value is calculated on the basis of the calculated binding secret information (Binding Secret), and it is verified whether the hash value is consistent with the verification value ICV. In a case of consistency, the calculated binding secret information (Binding Secret) is a correct value, and it can be determined to be verification establishment.

Only when the verification is established and it is confirmed that the calculated binding secret information (Binding Secret) is correct, the processing proceeds to processing of the following step.

When the verification is not established and it is not confirmed that the calculated binding secret information (Binding Secret) is correct, the processing does not proceed to processing of the following step. In this case, for example, the authentication key (Kauth) not being generated on the basis of a correct user ID and password is considered as a reason, and the user ID and the password are required to be input again, and thus processing of generating the authentication key (Kauth) is executed again.

(Step S205)

Next, in step S205, the information processing device calculates a title key (Title Key) from a converted title key (XORed Title Key) by applying the binding secret information (Binding Secret) calculated in step S204.

As described above, the converted title key (XORed Title Key) is converted data of the title key which is generated by the following Equation 1.

$$XORed\ Title\ Key=Title\ Key(xor)Binding\ Secret \quad (1)$$

That is, the converted title key (XORed Title Key) is calculated by exclusive OR computation between the title key (Title Key) and the binding secret information (Binding Secret).

In step S205, the title key (Title Key) is calculated from the converted title key (XORed Title Key) by the following Equation 11, by applying the binding secret information (Binding Secret) which is calculated in step S204.

$$Title\ Key=XORed\ Title\ Key(xor)Binding\ Secret \quad (11)$$

(Step S206)

Next, in step S206, the information processing device reads out an encrypted content to be reproduced, from a general-purpose area of the information storage device.

(Step S207)

Finally, the information processing device executes decryption processing having the title key calculated in step S205 applied thereto with respect to the encrypted content which is read out from the information storage device in step S206, and reproduces a content which is obtained as a result of the decryption.

Next, when content reproduction processing conditioning reproduction on the establishment of user authentication processing is performed, a sequence of processing executed by the information processing device (reproducing device) will be described with reference to a flow chart shown in FIG. 11.

Figure 11:
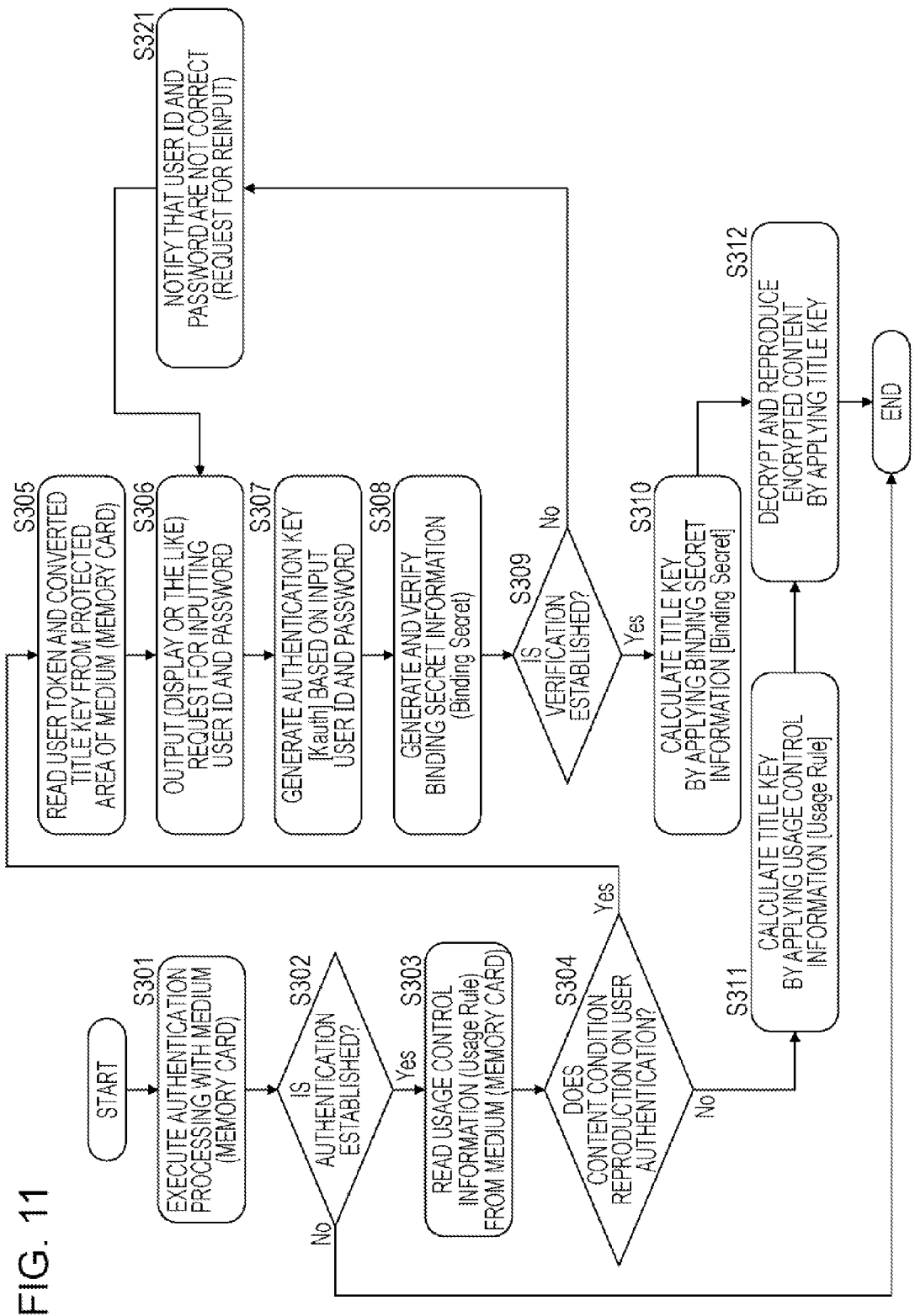
FIG. 11 is a flow chart illustrating a sequence of content reproduction control accompanied by user authentication processing which is executed in an information processing device.

Processing based on a flow shown in FIG. 11 is executed under the control of a data processing unit of the information processing device (reproducing device), specifically, under the control of a control unit having a CPU that executes a content reproduction application.

Meanwhile, a program (content reproduction application) with a processing sequence based on the flow shown in FIG. 11 recorded therein is recorded in a memory of the information processing device, and is executed in the CPU of the information processing device.

Processing of steps of the flow shown in FIG. 11 will be described below.

(Step S301)

First, mutual authentication processing is executed with the information storage device storing a content. This processing corresponds to the processing of step S201 of the sequence diagram shown in FIG. 9.

In the authentication processing, processing of sharing a session key (=bus key: Bk) is executed together.

(Step S302)

When the authentication processing of step S301 is established, the processing proceeds to step S303.

When the authentication processing of step S301 is not established, the subsequent pieces of processing are not executed. That is, in this case, a content is not reproduced.

(Step S303 to Step S304)

When mutual authentication is established and it is confirmed that both devices are reliable devices, in step S303, the information processing device performs processing of reading out usage control information (Usage Rule) which is stored in a general-purpose area of an information storage device (medium) such as a memory card.

The usage control information (Usage Rule) is information that stores, for example, the data described above with reference to FIG. 5.

When a content to be reproduced which corresponds to the read-out usage control information (Usage Rule) is a content conditioning reproduction on the establishment of user authentication, the following pieces of data which are described above with reference to FIG. 5 are recorded in the usage control information (Usage Rule).

(1) User token ID
(2) User ID

On the other hand, when a content to be reproduced is a content not conditioning reproduction on the establishment of user authentication, invalid data (NULL), for example, all values of zero are recorded in setting columns of the above-described data of the usage control information (Usage Rule).

The information processing device verifies whether valid data is recorded in recording columns of the user token ID and a user ID of the usage control information (Usage Rule), and determines whether the content corresponding to the usage control information is a content conditioning reproduction allowance on the establishment of user authentication.

When it is determined that the content is a content conditioning reproduction allowance on the establishment of user authentication, the determination result of step S304 is Yes, and the processing proceeds to step S305.

On the other hand, when it is determined that the content is not a content conditioning reproduction allowance on the establishment of user authentication, the determination result of step S304 is No, and the processing proceeds to step S311.

(Step S311 to Step S312)

First, a description will be given of processing in a case where it is determined in step S304 that the content is not a content conditioning reproduction allowance on the establishment of user authentication.

In this case, the pieces of processing of step S305 to step S310 are omitted, and processing of generating a title key which is a key for decrypting an encrypted content is performed in step S311.

In step S311, the title key is generated using usage control information (Usage Rule).

When a content is a content not conditioning reproduction allowance on the establishment of user authentication, a converted title key (XORed Title Key) stored in the protected area of the information storage device such as a memory card is a title key which is generated by, for example, the following equation.

XORed Title Key=Title Key(xor)(hash(Usage Rule))

That is, the converted title key (XORed Title Key) is generated by exclusive OR computation between the title key (Title Key) and the hash value of the usage control information (Usage Rule).

Therefore, in this case, in step S311, the title key (Title Key) is calculated by the following equation.

Title Key=XORed Title Key(xor)(hash(Usage Rule))

After this processing, in step S312, the information processing device reads out an encrypted content to be reproduced from the general-purpose area of the information storage device, executes decryption processing having the title key, calculated in step S311, applied thereto with respect to the read-out encrypted content, and reproduces a content obtained as a result of the decryption.

(Step S305)

Next, a description will be given of processing in a case where it is determined in step S304 that the content is a content conditioning reproduction allowance on the establishment of user authentication.

In this case, first, in step S305, processing of reading out the following pieces of data from the protected area of the information storage device, on the basis of information recorded in the usage control information (Usage Rule) is executed.

(1) Converted title key (XORed Title Key)
(2) User token (UserToken),

These pieces of data are read out from the protected area of the information storage device.

Meanwhile, at the time of processing of reading out data from the protected area, processing of determining whether the information processing device has an access right to a data storage area of the protected area is executed. The determination processing is performed with reference to information recorded in a device certificate received from, for example, the information processing device by the information storage device, that is, information recorded in a host certificate (Host Certificate) storing the public key described above with reference to FIG. 6.

In the determination processing, only when it is determined that the information processing device has an access right to the storage area of the converted title key and the user token which is the protected area, the converted title key and the user token are read out in step S305.

When it is determined that the information processing device does not have an access right to the storage area of the converted title key and the user token which is the protected area, data is not read out in step S305. In this case, a content is not reproduced.

(Step S306)

Next, in step S306, the information processing device outputs a request for inputting a user ID and a password from a user. Specifically, for example, input columns of the user ID and the password and a message for prompting an input are displayed on a display unit.

Meanwhile, the user ID and the password may be stored in advance in the information processing device or a memory of the information storage device, without requesting an input from the user in step S306, and then may be read out. That is, a configuration may be made such that the user ID and the password recorded in advance in a memory capable of being accessed by a content reproduction processing application, executing the processing based on FIGS. 9 and 10, are read out and that the read-out data is used.

(Step S307)

Next, in step S307, the information processing device generates an authentication key (Kauth) using a user ID and a password which are input, or using the user ID and the password which are read out from the memory.

As described above, the authentication key (Kauth) is calculated by the following Equation 2.

$$Kauth=func(User\ ID\|Password) \quad (2)$$

(Step S308)

Next, in step S308, the information processing device decrypts a user token (UserToken) by applying the generated authentication key (Kauth) to generate binding secret information (Binding Secret), and verifies whether the generated binding secret information (Binding Secret) is correct data.

As described above, the user token (UserToken) is data which is generated by the following calculation equation (Equation 5).

$$UserToken=Enc(Kauth,Binding\ Secret\|ICV) \quad (5)$$

In step S308, as described above, the binding secret information (Binding Secret) is acquired by the following Equation 10.

$$(Binding\ Secret\|ICV)=Dec(Kauth,UserToken) \quad (10)$$

When decryption processing based on the authentication key (Kauth) according to Equation 10 mentioned above is performed, coupled data between the binding secret information (Binding Secret) and the verification value (ICV) thereof, that is, the following data is obtained.

Binding Secret∥ICV (Step S309)

The information processing device verifies whether the calculated binding secret information (Binding Secret) is a correct value, by applying the coupled data between the binding secret information (Binding Secret) calculated in step S308 and the verification value (ICV) thereof, that is, Binding Secret∥ICV which is the verification value ICV of the above-described data.

Meanwhile, the verification value ICV is a hash value, a MAC value, or encrypted data which is generated on the basis of correct binding secret information (Binding Secret).

For example, when the ICV is a hash value, a hash value based on the binding secret information (Binding Secret) calculated in step S308 is calculated, and the calculated hash value and the ICV value are collated with each other, and thus it is possible to verify whether the calculated binding secret information (Binding Secret) is a correct value.

In step S309, when the verification is established and it is determined that the binding secret information (Binding Secret) is a correct value, the processing proceeds to step S310.

On the other hand, when the verification is not established, the processing proceeds to step S321.

(Step S321)

First, a description will be given of processing of step S321 in a case where the verification is not established in step S309.

An incorrect user ID and password which are input by a user are considered as one of reasons of the failure of verification establishment.

This is because an authentication key (Kauth) is generated on the basis of a user ID and a password and binding secret information (Binding Secret) is generated by applying the authentication key (Kauth).

Therefore, in step S309, when the verification establishment fails, the processing proceeds to step S321. Then, a user is notified that the user ID and the password are incorrect and is requested to input a user ID and a password again. Then, the processing proceeds to step S306, and processing of inputting a user ID and a password is repeatedly executed.

Meanwhile, this processing is optional, and a configuration may be made such that the processing of inputting a user ID and a password is not repeatedly executed and the subsequent pieces of processing are stopped.

(Step S310)

Next, a description will be given of processing of step S310 in a case where the verification is established in step S309 and it is determined that the binding secret information (Binding Secret) is a correct value.

In step S310, the information processing device calculates a title key (Title Key) from a converted title key (XORed Title Key) by applying the binding secret information (Binding Secret) calculated in step S307.

As described above, the converted title key (XORed Title Key) is converted data of the title key which is generated by the following Equation 1.

$$XORed\ Title\ Key=Title\ Key(xor)Binding\ Secret \quad (1)$$

That is, the converted title key (XORed Title Key) is calculated by exclusive OR computation between the title key (Title Key) and the binding secret information (Binding Secret).

In step S310, the title key (Title Key) is calculated from the converted title key (XORed Title Key) by the following Equation 11, by applying the binding secret information (Binding Secret) calculated in step S308.

$$Title\ Key=XORed\ Title\ Key(xor)Binding\ Secret \quad (11)$$

(Step S312)

Next, in step S312, the information processing device reads out an encrypted content to be reproduced, from the general-purpose area of the information storage device, executes decryption processing having the title key calculated in step S310 applied thereto with respect to the read-out encrypted content, and reproduces a content obtained as a result of the decryption.

In this manner, in the processing of the present disclosure, content reproduction can be conditioned on user authentication processing.

The user authentication processing can be independently executed by the information processing device that executes content reproduction processing without being associated with communication processing, for example, connection processing with a server.

Finally, it is determined that the user authentication processing is established by the establishment of the verification processing of the binding secret information (Binding Secret) of step S309 shown in the flow of FIG. 11.

That is, when it is confirmed that correct binding secret information (Binding Secret) is calculated, it is determined that the user authentication is established.

Meanwhile, when correct binding secret information (Binding Secret) is not obtained, a correct title key cannot be calculated at the time of calculating the title key in the subsequent step S310. As a result, the decryption of the encrypted content fails, and thus a content cannot be reproduced.

As described above, the binding secret information (Binding Secret) indicates that the decryption of a user token having the authentication key (Kauth) according to Equation 10 mentioned above applied thereto is correctly performed.

$$(Binding\ Secret \| ICV) = Dec(Kauth, UserToken) \quad (10)$$

The decryption processing of Equation 10 mentioned above is correctly performed on condition that a correct authentication key (Kauth) is generated.

As described above, the authentication key (Kauth) is calculated by the following Equation 2 mentioned above.

$$Kauth = func(User\ ID \| Password) \quad (2)$$

That is, only when a correct user ID and password are acquired, a correct authentication key (Kauth) can be calculated.

Furthermore, only when the decryption of a user token having the correct authentication key (Kauth), calculated on the basis of the correct user ID and password, applied thereto is executed, correct binding secret information (Binding Secret) can be calculated.

In this manner, only when the user ID and the password are consistent with data, applied at the time of generating the authentication key (Kauth) generated by a server, a correct authentication key can be generated.

Only in this case, correct binding secret information (Binding Secret) can be generated.

Furthermore, as a result, it is possible to calculate a correct title key (Title Key) from a converted title key (XORed Title Key), and only when the correct title key (Title Key) is obtained, the decryption of an encrypted content succeeds, and thus a content can be reproduced.

That is, at the time of reproducing a content, for example, only when a user ID and a password which are input by a user are consistent with user account information of an authorized user which is confirmed on the server side at the time of content downloading, the content is allowed to be reproduced.

In this manner, according to the configuration of the present disclosure, it is possible to perform content usage control on condition of the establishment of user authentication without communicating with a server or the like.

[7. With Regard to Embodiment to which Secret Information Corresponding to Reproducing Device or Reproduction Application is Applied]

In the above-described embodiment, in processing of recording an encrypted content in the information storage device described above with reference to FIG. 8, the following pieces of processing are executed.

(a1) Processing of generating authentication key (Kauth) by applying user ID and password (a2) Processing in which binding secret information (Binding Secret) corresponding to content having generated authentication key (Kauth) applied thereto is encrypted to generate user token (UserToken) and generated user token (UserToken) is stored in information storage device (a3) Processing in which converted title key (XORed Title Key) is generated by computation between binding secret information (Binding Secret) and title key (Title Key) and generated converted title key (XORed Title Key) is stored in information storage device These pieces of processing are executed in the processing of recording the encrypted content in the information storage device described above with reference to FIG. 8.

In addition, in processing of decrypting an encrypted content stored in the information storage device described above with reference to FIG. 9 to FIG. 11, the following pieces of processing are executed.

(b1) Processing of reading out user token (UserToken) and converted title key (XORed Title Key) from information storage device (b2) Processing of generating authentication key (Kauth) by applying user ID and password (b3) Processing of generating binding secret information (Binding Secret) by decryption of user token (UserToken) using generated authentication key (Kauth)

(b4) Processing of calculating title key (Title Key) by computation between binding secret information (Binding Secret) and converted title key (XORed Title Key)

These pieces of processing are executed in the processing of decrypting the encrypted content stored in the information storage device described above with reference to FIG. 9 to FIG. 11.

Based on these pieces of processing, it is necessary to calculate a correct authentication key (Kauth) in order to calculate the title key (Title Key) which is used to decrypt the encrypted content.

In order to calculate the correct authentication key (Kauth), a correct user ID and password are necessary.

As a result, the decryption and use of the encrypted content can be limited to a specific authorized user who knows a correct user ID and password.

In this manner, in the above described embodiment, a configuration can be made such that the use of the encrypted content is limited to a specific user.

Furthermore, hereinafter, a description will be given of an embodiment in which a reproducing device or an application reproducing a content can also be limited in addition to the limitation of a user using a content.

A description will be given of an embodiment in which at least one of a reproducing device reproducing a content and a reproduction application which is a reproduction program executed in the reproducing device is limited.

Hereinafter, as an example, a description will be given of a configuration in which a reproducing device reproducing a content can be limited.

The reproducing device has an application key as secret information inherent to the reproducing device. For example, the application key is recorded as a common key in a memory of a device having a specific model number which is manufactured by a specific reproducing device maker.

A description will be given of processing in which an information processing device (host) equipped with an information storage device such as a memory card has access to a content providing server and a content provided from the server is downloaded to be recorded in the memory card.

Figure 12:
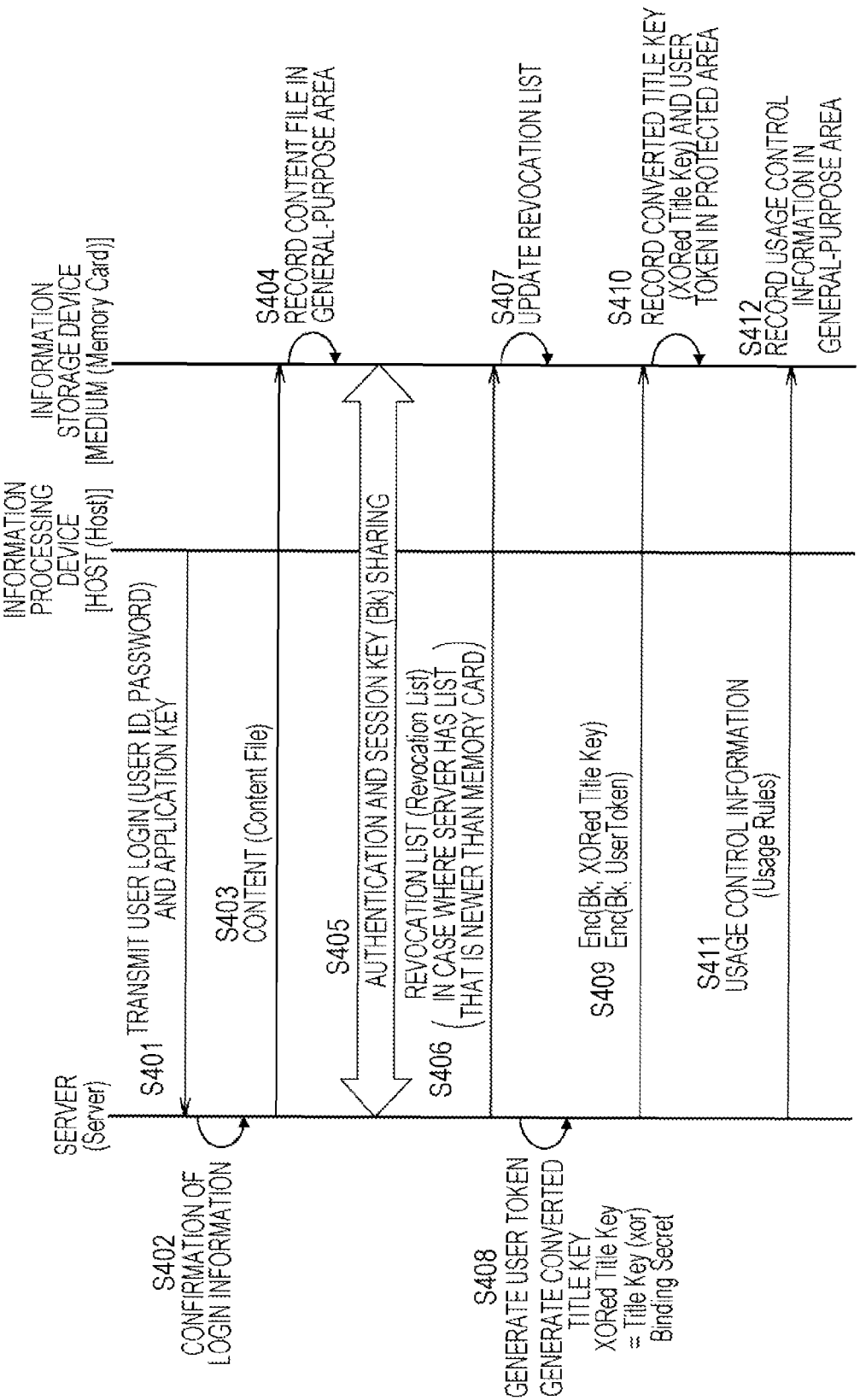
FIG. 12 is a diagram illustrating a sequence of downloading and recording processing of a content.

FIG. 12 is a diagram similar to the sequence diagram of FIG. 8 described in the previous embodiment, and is a diagram illustrating a processing sequence at the time of recording a content downloaded from a server in an information storage device which is a medium such as a memory card.

FIG. 12 illustrates the following components from the left of the drawing.

(a) Server that executes content provision processing (b) Information processing device (host) equipped with information storage device (medium) such as memory card (c) Information storage device (medium), such as memory card, which is recording destination of content The information processing device (host) is a reproducing device which is equipped with an information storage device (medium) such as a memory card and is capable of reproducing a content which is recorded in the information storage device (medium). The information processing device (host) stores, in a storage unit, a host certificate (Host Cert) having the data configuration described above with reference to FIG. 6.

The information storage device is, for example, the memory card 31 having the configuration described above with reference to FIG. 3, and includes the controller 110 functioning as a data processing unit that executes data processing, and the storage unit 120.

Meanwhile, the information processing device (host) is equipped with an information storage device (medium) such as a memory card. Data processing units of the information processing device (host) and the information storage device (medium) communicate with a server and sequentially execute processing of step S101 and the subsequent pieces of processing which are illustrated in the drawing, thereby executing pieces of processing of downloading and recording a content.

Hereinafter, processing of step S401 and the subsequent pieces of processing will be described in detail.

Meanwhile, pieces of processing of step S401 to step S412 shown in FIG. 12 are pieces of processing which are substantially similar to the pieces of processing of step S101 to step S112 of the sequence diagram shown in FIG. 8, and the processing of step S401 is different from the processing of step S408.

Since pieces of processing of other steps are similar to the pieces of processing described above with reference to FIG. 8, these pieces of processing will be briefly described.

(Step S401)

First, the information processing device (host) equipped with an information storage device (medium) such as a memory card which serves as a recording medium of a downloaded content transmits, to a server, a user ID (User ID) and a password (Password) which are input by a user and an application key (Kapl) stored in a memory of the information processing device, as user login processing.

The user ID, the password, and the application key (Kapl) are generation information of an authentication key (Kauth). The authentication key (Kauth) is generated by the following Equation 12 to which the user ID, the password, and the application key (Kapl) are applied.

$$\text{Kauth=func(User ID}\|\text{Password}\|\text{Kapl)} \qquad (12)$$

(Step S402)

Next, the server confirms whether the user ID (User ID) and the password (Password) received from the information processing device (host) are consistent with a user ID and a password of an authorized user which are registered in advance in the server, that is, executes processing of verifying login information.

(Step S403)

When the user ID (User ID) and the password (Password) received from the information processing device (host) are consistent with the user ID and the password of the authorized user which are registered in advance in the server, the server transmits a content to the information storage device in step S403.

(Step S404)

In step S404, an encrypted content transmitted from the server is recorded in a general-purpose area (user data area) of the information storage device.

Meanwhile, a content cannot be reproduced and used only by acquiring the encrypted content. It is necessary to acquire a title key which is an encryption key corresponding to the encrypted content.

(Step S405)

In step S405, mutual authentication processing and processing of sharing a session key (=bus key: Bk) are executed between the server and the information storage device. These pieces of processing are mutual authentication processing and key sharing processing based on a public key encryption system, and processing of confirming the reliability of both the server and the information storage device and processing of generating and sharing the session key (=bus key: Bk) are performed.

(Step S406 to Step S407)

In step S406 to step S407, processing of synchronizing a revocation list is executed. That is, when a version of a revocation list stored in the information storage device is older than a version of a revocation list held by the server, a new revocation list is provided to the information storage device from the server, and updating processing of replacing the old revocation list stored in the information storage device with the new revocation list is performed.

(Step S408)

Next, in step S408, the server generates the following pieces of data.

(1) User token (UserToken)

(2) Converted title key

As described above, the user token (UserToken) is generated on the basis of content-specific binding secret information (Binding Secret), constituted by random numbers generated by a content providing server, and an authentication key (Kauth). Specifically, the user token is calculated by the following calculation equation (Equation 5) described above.

$$\text{UserToken=Enc(Kauth,Binding Secret}\|\text{ICV)} \qquad (5)$$

However, in this embodiment, the authentication key (Kauth) is a key calculated by applying a predetermined function to a user ID (User ID), a user password (Password), and an application key (Kapl) which is secret information inherent in a reproducing device.

In this manner, the user token (UserToken) calculated by the calculation equation (Equation 5) mentioned above is data which is generated on the basis of the following pieces of information.

(A) Authentication key (Kauth) generated by applying user ID, user password, and application key (Kapl)

(B) Content-specific binding secret information (Binding Secret) generated corresponding to content Furthermore, in step S408, the server generates a converted title key (XORed Title Key).

The converted title key (XORed Title Key) is converted data of a title key which is a key to be applied to decryption processing of the encrypted content stored in the information storage device in step S403.

As described above, the converted title key (XORed Title Key) is generated by, for example, exclusive OR computation (XOR) between the content-specific binding secret information (Binding Secret), constituted by random numbers generated by a content providing server, and the title key. Specifically, the converted title key is calculated by the following Equation 1 mentioned above.

$$\text{XORed Title Key} = \text{Title Key}(xor)\text{Binding Secret} \quad (1)$$

(Step S409)

In step S409, the server transmits the following pieces of data generated in step S408 to the information storage device (medium).

(1) User token (UserToken)
(2) Converted title key

Meanwhile, these pieces of data are encrypted using the session key (Bk) generated in step S405 and is transmitted.

(Step S410)

Next, the information storage device records the following pieces of data received from the server in step S409 in a protected area (secure area).

(1) User token (UserToken)
(2) Converted title key

That is, these pieces of data are set to the stored data of the protected area 122 described above with reference to FIG. 4.

(Step S411)

First, in step S411, the server transmits usage control information (Usage Rule) corresponding to the encrypted content transmitted in step S403 to the information storage device.

(Step S412)

Next, in step S412, the information storage device records, in the general-purpose area (user data area), the usage control information (Usage Rule) received from the server.

Based on the sequence illustrated in FIG. 12, the following pieces of data that are provided from the server are recorded in the general-purpose area of the information storage device.

(1) Encrypted content
(2) Usage control information

The following pieces of data that are provided from the server are stored in the protected area of the information storage device.

(3) Converted title key (XORed Title Key)
(4) User token (UserToken)

Next, when content reproduction processing conditioning reproduction on the establishment of user authentication processing and the confirmation of a reproducing device is performed, a sequence of processing executed by the information processing device (reproducing device) will be described with reference to a flow chart shown in FIG. 13.

Figure 13:
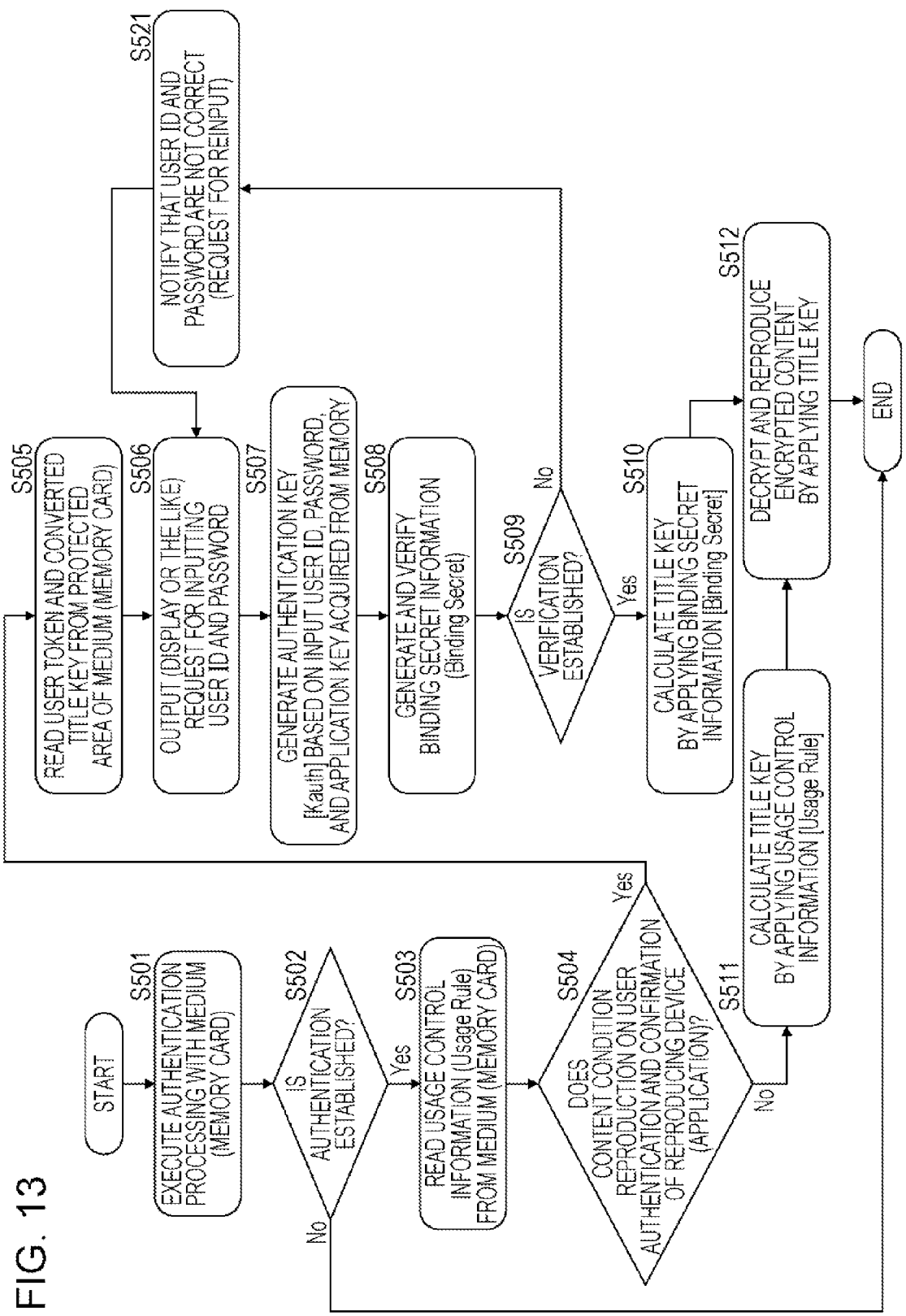
FIG. 13 is a flow chart illustrating a sequence of content reproduction control accompanied by user authentication processing which is executed in an information processing device.

FIG. 13 corresponds to the flow shown in FIG. 11 described in the previous embodiment. The processing based on the flow is executed under the control of a data processing unit of the information processing device (reproducing device), specifically, under the control of a control unit having a CPU that executes a content reproduction application.

Meanwhile, a program (content reproduction application) with a processing sequence based on the flow shown in FIG. 13 recorded therein is recorded in a memory of the information processing device and is executed by the CPU of the information processing device.

Most of pieces of processing of step S501 to step S512 of the flow shown in FIG. 13 are similar to the above-described pieces of processing of step S301 to step S312 of the flow shown in FIG. 11.

Different pieces of processing are processing of step S504 and processing of step S507.

Therefore, hereinafter, the pieces of processing of the two steps will be described in detail, and pieces of processing of other steps will be briefly described.

(Step S501)

First, mutual authentication processing is executed with the information storage device storing a content.

(Step S502)

When the authentication processing of step S501 is established, the processing proceeds to step S503.

When the authentication processing of step S501 is not established, the subsequent pieces of processing are not executed. That is, in this case, a content is not reproduced.

(Step S503 to Step S504)

When mutual authentication is established and it is confirmed that both devices are reliable devices, in step S503, the information processing device performs processing of reading out usage control information (Usage Rule) which is stored in a general-purpose area of an information storage device (medium) such as a memory card.

The usage control information (Usage Rule) is information that stores, for example, the data described above with reference to FIG. 5.

When a content to be reproduced which corresponds to the read-out usage control information (Usage Rule) is a content conditioning reproduction on the establishment of user authentication and the establishment of device confirmation, the usage control information (Usage Rule) has the following pieces of data, which are described above with reference to FIG. 5, recorded therein.

(1) User token ID
(2) User ID

On the other hand, when a content to be reproduced is a content not conditioning reproduction on the establishment of user authentication and the establishment of device confirmation, invalid data (NULL), for example, all values of zero are recorded in setting columns of the above-described data of the usage control information (Usage Rule).

The information processing device verifies whether valid data is recorded in recording columns of a user token ID and a user ID of the usage control information (Usage Rule), and determines whether a content corresponding to the usage control information is a content conditioning reproduction allowance on the establishment of user authentication and the establishment of device confirmation.

When it is determined that the content is a content conditioning reproduction allowance on the establishment of user authentication and the establishment of device confirmation, the determination result of step S504 is Yes, and the processing proceeds to step S505.

On the other hand, when it is determined that the content is not a content conditioning reproduction allowance on the establishment of user authentication and the establishment of device confirmation, the determination result of step S504 is No, and the processing proceeds to step S511.

(Step S511 to Step S512)

First, a description will be given of processing in a case where it is determined in step S504 that the content is not a content conditioning reproduction allowance on the establishment of user authentication and the establishment of device confirmation.

In this case, the pieces of processing of step S505 to step S510 are omitted, and processing of generating a title key which is a key for decrypting an encrypted content is performed in step S511.

In step S511, the title key is generated using usage control information (Usage Rule).

After this processing, in step S512, the information processing device reads out an encrypted content to be reproduced from the general-purpose area of the information storage device, executes decryption processing having the title key calculated in step S511 applied thereto with respect to the read-out encrypted content, and reproduces a content obtained as a result of the decryption.

(Step S505)

Next, a description will be given of processing in a case where it is determined in step S504 that the content is a content conditioning reproduction allowance on the establishment of user authentication and the establishment of device confirmation.

In this case, first, in step S505, processing of reading out the following pieces of data from the protected area of the information storage device, on the basis of information recorded in the usage control information (Usage Rule) is executed.

(1) Converted title key (XORed Title Key)
(2) User token (UserToken),

These pieces of data are read out from the protected area of the information storage device.

(Step S506)

Next, in step S506, the information processing device outputs a request for inputting a user ID and a password from a user. Specifically, for example, input columns of the user ID and the password and a message for prompting an input are displayed on a display unit.

(Step S507)

Next, in step S507, the information processing device generates an authentication key (Kauth) using a user ID and a password which are input, and an application key (Kapl) stored in a memory of the information processing device (reproducing device).

As described above, the authentication key (Kauth) is calculated by the following Equation 12.

$$\text{Kauth=func(User ID||Password||Kapl)} \tag{12}$$

(Step S508)

Next, in step S508, the information processing device decrypts a user token (UserToken) by applying the generated authentication key (Kauth) to generate binding secret information (Binding Secret), and verifies whether the generated binding secret information (Binding Secret) is correct data.

(Step S509)

The information processing device verifies whether the calculated binding secret information (Binding Secret) is a correct value, by applying the coupled data between the binding secret information (Binding Secret) calculated in step S508 and the verification value (ICV) thereof, that is, Binding Secret||ICV which is the verification value ICV of the above-described data.

In step S509, when the verification is established and it is determined that the binding secret information (Binding Secret) is a correct value, the processing proceeds to step S510.

On the other hand, when the verification is not established, the processing proceeds to step S521.

(Step S521)

First, a description will be given of processing of step S521 in a case where the verification is not established in step S509.

An incorrect user ID and password which are input by a user are considered as one of reasons of the failure of verification establishment. Alternatively, it is also assumed that an application key (Kapl) which is secret information of a reproducing device is different from the application key (Kapl) applied to the generation of the authentication key (Kauth) at the time of content recording.

This is because the authentication key (Kauth) is generated on the basis of a user ID, a password, and an application key (Kapl) and binding secret information (Binding Secret) is generated by applying the authentication key (Kauth).

Therefore, in step S509, when the verification establishment fails, the processing proceeds to step S521. Then, a user is notified that the user ID and the password or the application key (Kapl) are incorrect and is requested to input a user ID and a password again. Then, the processing proceeds to step S506, and processing of inputting a user ID and a password is repeatedly executed.

Meanwhile, this processing is optional, and a configuration may be made such that the processing of inputting a user ID and a password is not repeatedly executed and the subsequent pieces of processing are stopped.

(Step S510)

Next, a description will be given of processing of step S510 in a case where the verification is established in step S509 and it is determined that the binding secret information (Binding Secret) is a correct value.

In step S510, the information processing device calculates a title key (Title Key) from a converted title key (XORed Title Key) by applying the binding secret information (Binding Secret) calculated in step S507.

(Step S512)

Next, in step S512, the information processing device reads out an encrypted content to be reproduced, from the general-purpose area of the information storage device, executes decryption processing having the title key calculated in step S510 applied thereto with respect to the read-out encrypted content, and reproduces a content obtained as a result of the decryption.

In this manner, in the processing of the present disclosure, content reproduction can be conditioned on user authentication processing and the confirmation of a reproducing device.

Finally, it is determined that the user authentication processing and the confirmation processing of the reproducing device are established by the establishment of the verification processing of the binding secret information (Binding Secret) of step S509 shown in the flow of FIG. 13.

That is, when it is confirmed that correct binding secret information (Binding Secret) is calculated, it is determined that the user authentication and device confirmation are established.

Meanwhile, when correct binding secret information (Binding Secret) is not obtained, a correct title key cannot be calculated at the time of calculating a title key in the subsequent step S510. As a result, the decryption of the encrypted content fails, and thus a content cannot be reproduced.

As described above, the binding secret information (Binding Secret) indicates that the decryption of a user token to which the authentication key (Kauth) according to Equation 10 mentioned above is applied is correctly performed.

$$\text{(Binding Secret||ICV)=Dec(Kauth,UserToken)} \tag{10}$$

The decryption processing of Equation 10 mentioned above is correctly performed on condition that a correct authentication key (Kauth) is generated.

As described above, the authentication key (Kauth) is calculated by the following Equation 12 mentioned above.

$$\text{Kauth=func(User ID||Password||Kapl)} \tag{12}$$

That is, only when a correct user ID and password and a correct application key (Kapl), that is, an application key (Kapl) that is the same as the application key (Kapl) provided by the information processing device at the time of recording a content are acquired, a correct authentication key (Kauth) can be calculated.

Furthermore, only when the decryption of a user token having the correct authentication key (Kauth), calculated on the basis of the correct user ID and password and the correct application key (Kapl), applied thereto is executed, correct binding secret information (Binding Secret) can be calculated.

In this manner, only when the user ID, the password, and the application key (Kapl) are consistent with data, applied at the time of generating the authentication key (Kauth) generated by a server, a correct authentication key can be generated.

Only in this case, correct binding secret information (Binding Secret) can be generated.

Furthermore, as a result, it is possible to calculate a correct title key (Title Key) from a converted title key (XORed Title Key), and only when the correct title key (Title Key) is obtained, the decryption of an encrypted content succeeds, and thus a content can be reproduced.

That is, at the time of reproducing a content, for example, only when a user ID and a password which are input by a user are consistent with user account information of an authorized user which is confirmed on the server side at the time of content downloading and only when an application key (Kapl) held by an information processing device reproducing a content is consistent with an application key (Kapl) held by the information processing device which is confirmed on the server side at the time of content downloading, a content is allowed to be reproduced.

In this manner, according to the configuration of the present embodiment, it is possible to perform content usage control on condition of the establishment of user authentication and device confirmation without performing communication with a server or the like.

Meanwhile, in the above-described embodiment, an example in which an application key (Kapl) is a key inherent in a reproducing device has been described. However, the application key (Kapl) is not limited to a device, and may be set as, for example, a key inherent in a reproduction application which is a reproduction program.

[8. With Regard to Example of Hardware Configurations of Respective Devices]

Finally, examples of hardware configurations of devices executing the above-described processing will be described with reference to FIGS. 14 and 15.

Figure 14:
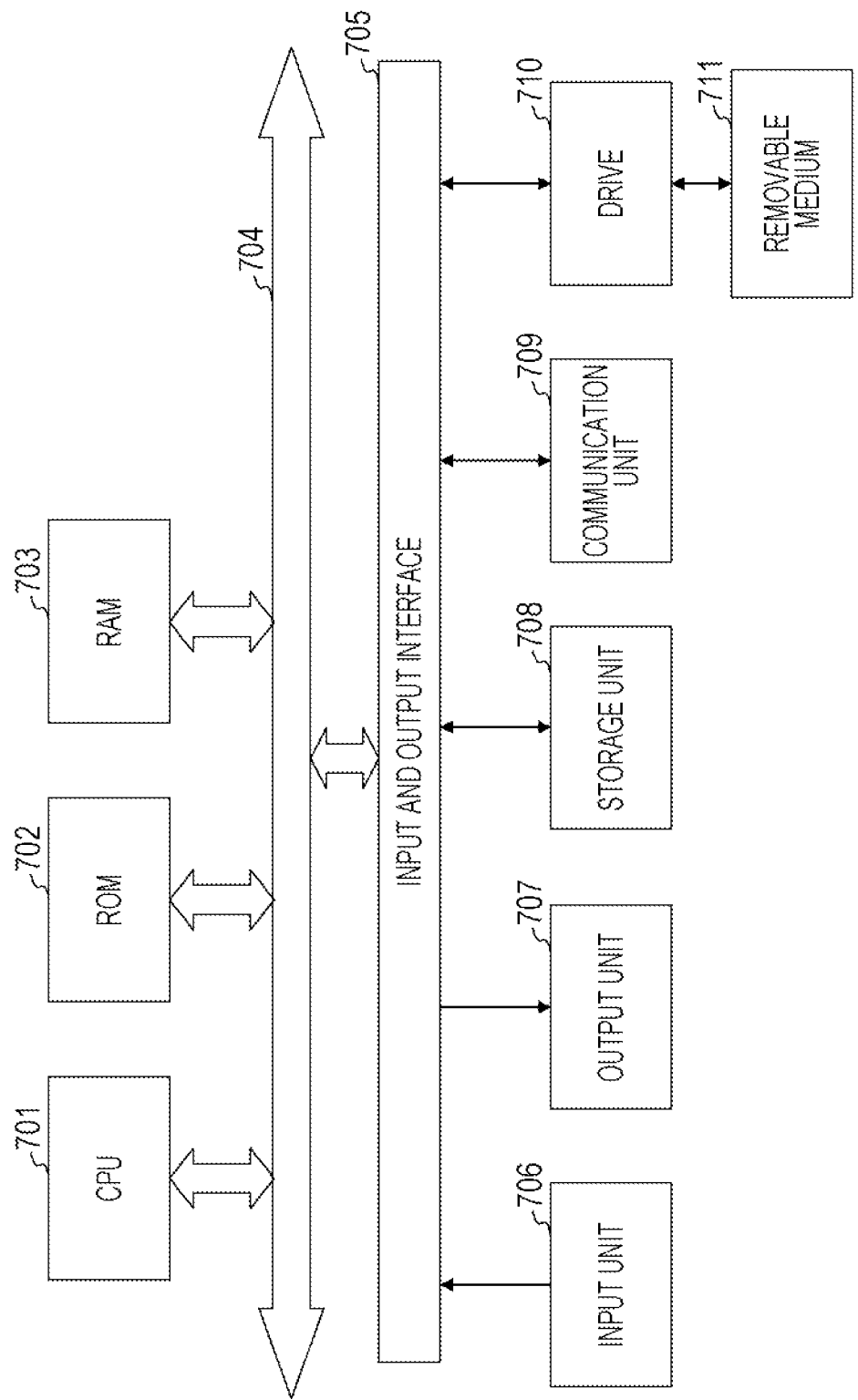
FIG. 14 is a diagram illustrating an example of a hardware configuration of an information processing device.

FIG. 14 illustrates an information processing device that records and reproduces a content in and from a medium and an example of a hardware configuration of the information processing device capable of being applied to a content providing device such as a content providing server.

A central processing unit (CPU) 701 functions as a data processing unit that executes various pieces of processing based on a program which is stored in a read only memory (ROM) 702 or a storage unit 708. For example, the CPU executes processing based on the above-described sequence. A random access memory (RAM) 703 stores a program to be executed by the CPU 701, data, and the like. The CPU 701, the ROM 702, and the RAM 703 are connected to each other via a bus 704.

The CPU 701 is connected to an input and output interface 705 through the bus 704, and an input unit 706 constituted by various switches, a keyboard, a mouse, a microphone, or the like and an output unit 707 constituted by a display, a speaker, or the like are connected to the input and output interface 705. The CPU 701 executes various pieces of processing in response to a command input from the input unit 706 and outputs a processing result to the output unit 707, for example.

The storage unit 708 connected to the input and output interface 705 is constituted by, for example, a hard disk, and stores a program to be executed by the CPU 701 and various pieces of data. A communication unit 709 communicates with an external device via a network such as the Internet or a local area network.

A drive 710 connected to the input and output interface 705 drives a removable medium 711 such as a magnetic disk, an optical disc, a magneto-optical disc, or a semiconductor memory such as a memory card, and acquires various pieces of data such as a recorded content and key information. For example, processing of decrypting and reproducing a content is performed on the basis of a reproduction program executed by the CPU, using the acquired content or key data.

FIG. 15 illustrates an example of a hardware configuration of a memory card which is an information storage device.

A central processing unit (CPU) 801 functions as a data processing unit that executes various pieces of processing based on a program stored in a read only memory (ROM) 802 or a storage unit 807. For example, the CPU executes processing of communicating with a server or a host device, processing of writing or reading data in or from the storage unit 807, and processing of determining whether access can be performed in units of divided areas in a protected area 811 of the storage unit 807, and the like which are described above in the embodiments. A random access memory (RAM) 803 appropriately stores a program executed by the CPU 801, data, and the like. The CPU 801, the ROM 802, and the RAM 803 are connected to each other via a bus 804.

The CPU 801 is connected to an input and output interface 805 via the bus 804, and a communication unit 806 and the storage unit 807 are connected to the input and output interface 805.

The communication unit 804 connected to the input and output interface 805 communicates with a server or a host, for example. The storage unit 807 is a data storage area, and includes a protected area 811 with access restriction and a general-purpose area 812 which data can be freely recorded in and read from, as described above.

[9. Conclusion of Configuration According to the Present Disclosure]

The detailed description has been given so far of the embodiment of the present disclosure with reference to a specific embodiment. However, it is obvious that those skilled in the art can make modifications and replacements of the embodiment without departing from the scope of the present disclosure. That is, the present disclosure is described herein for illustrative purposes only and should not be exclusively understood. In order to determine a scope of the present disclosure, appended claims should be taken into consideration.

Meanwhile, the technique disclosed in this specification can adopt the following configurations.

(1) An information storage device including:
a storage unit that stores an encrypted content; and
a data processing unit that controls access of an external device to the storage unit,
wherein the storage unit stores a converted title key obtained by converting a title key which is an encryption key to be applied to decryption of the encrypted content, and a user token obtained by converting binding secret information to be applied to calculate the title key from the converted title key, and wherein the data processing unit allows an external device having an access right to the storage unit being confirmed therein to read out the user token.

(2) The information storage device according to (1) mentioned above, wherein the user token is data capable of being calculated by computation processing with an authentication key which is generated on the basis of user identification information, included in registration account information of a server performing use management of the encrypted content, and the binding secret information.

(3) The information storage device according to (1) or (2) mentioned above, wherein the user token is calculated data based on computation processing with an authentication key which is generated on the basis of a user ID and a user password, included in registration account information of a server performing use management of the encrypted content, and the binding secret information.

(4) The information storage device according to (2) or (3) mentioned above, wherein the user token is encrypted data based on the authentication key with respect to data including the binding secret information.

(5) The information storage device according to any one of (2) to (4) mentioned above, wherein the user token is encrypted data based on the authentication key with respect to data including the binding secret information and a verification value for the binding secret information.

(6) The information storage device according to any one of (1) to (5) mentioned above, wherein the binding secret information is a value inherent in the encrypted content.

(7) An information processing device including:

a data processing unit which is equipped with a medium storing an encrypted content encrypted using a title key and has a data processing unit that executes decryption processing of the encrypted content, wherein the data processing unit acquires, from the medium, a converted title key obtained by converting a title key which is an encryption key to be applied to the decryption of the encrypted content, and a user token obtained by converting binding secret information to be applied to calculate the title key from the converted title key, generates an authentication key on the basis of user identification information acquired by input processing through an input unit or read-out processing from a memory, calculates the binding secret information by computation processing between the user token and the authentication key, calculates the title key from the converted title key by applying the calculated binding secret information, and executes the decryption processing of the encrypted content by applying the calculated title key.

(8) The information processing device according to (7) mentioned above, wherein the data processing unit executes computation processing with respect to a user ID and a user password which are acquired by input processing through the input unit or read-out processing from the memory to generate the authentication key.

(9) The information processing device according to (7) or (8) mentioned above, wherein the data processing unit executes decryption processing of the user token to which the authentication key is applied, to calculate the binding secret information.

(10) The information processing device according to any one of (7) to (9) mentioned above, wherein the data processing unit executes decryption processing of the user token to which the authentication key is applied to calculate the binding secret information and a verification value for the binding secret information, and executes verification processing of the calculated binding secret information by using the calculated verification value.

(11) The information processing device according to any one of (7) to (10) mentioned above, wherein the data processing unit executes exclusive OR computation between the binding secret information and the converted title key to calculate a title key.

(12) A server that transmits an encrypted content to an information storage device, the server executing processing of:

receiving user identification information from an information processing device equipped with the information storage device, generating a user token by computation processing to which the received user identification information is applied, and a converted title key which is converted data of a title key to be applied to encryption processing of the encrypted content, and transmitting the generated user token and converted title key as stored data of the information storage device.

(13) The server according to (12) mentioned above, wherein the server receives a user ID and a password as the user identification information, and generates the authentication key by computation processing with respect to the user ID and the password.

(14) The server according to (12) or (13) mentioned above, wherein the server generates binding secret information as an inherent value corresponding to the encrypted content, and generates the user token by encryption processing to which the authentication key for the binding secret information is applied.

(15) An information processing system including:

an information storage device that stores an encrypted content, a converted title key obtained by converting a title key which is a decryption key of the encrypted content, and a user token obtained by converting binding secret information to be applied to calculate the title key from the converted title key; and an information processing device that executes reproduction processing of the encrypted content, wherein the information processing device acquires the converted title key and the user token from the information storage device, generates an authentication key on the basis of user identification information that is acquired by input processing through an input unit or read-out processing from a memory, calculates the binding secret information by computation processing between the user token and the authentication key, calculates the title key from the converted title key by applying the calculated binding secret information, and executes the decryption processing of the encrypted content by applying the calculated title key.

Furthermore, a processing method implemented in the aforementioned device and system and a program which causes processing to be executed are also included in the configurations of the present disclosure.

In addition the series of processing described herein can be executed by hardware, software, or a combined configuration of both. When the processing is executed by software, the program with a processing sequence recorded therein can be installed in a memory within a computer embedded in dedicated hardware and executed, or a program can be installed in a general-purpose computer which can execute various pieces of processing and executed. The program can be recorded in advance in a recording medium, for example. The program can not only be installed form the recording medium to the computer but also be received via a network such as a local area network (LAN) or the Internet and installed in a recording medium such as a built-in hard disk.

Meanwhile, the various pieces of processing described herein may be executed in a time series in an order of the description or may be executed in parallel or individual manner depending on a processing capability of a device which executes the processing or depending on necessity. In addition, the term "system" used in this specification is a logical complex configuration of a plurality of devices, and devices with various configurations are not necessarily provided in the same housing.

INDUSTRIAL APPLICABILITY

As described above, according to an embodiment of the present disclosure, content usage control is realized on condition of the establishment of user authentication, without having to communicate with a server or the like.

Specifically, an information storage device such as a memory card stores an encrypted content, a converted title key obtained by converting a title key which is an encryption key, and a user token obtained by converting binding secret information to be applied to calculate the title key from the converted title key. A reproducing device that decrypts and reproduces the encrypted content acquires the converted title key and the user token, and generates an authentication key on the basis of user identification information such as a user ID. Furthermore, the reproducing device calculates the binding secret information by computation processing between the user token and the authentication key, calculates the title key from the converted title key by applying the calculated binding secret information, and executes decryption processing of the encrypted content by applying the calculated title key.

Based on such configurations, it is possible to realize content usage control on condition of the establishment of user authentication, without having to communicate with a server or the like.

REFERENCE SIGNS LIST

11 Broadcasting station
12 Content server
20 Information processing device
21 Recording and reproducing dedicated device
22 PC
23 Portable terminal
30 Information storage device
31 Memory card
110 Controller (data processing unit)
111 CPU
112 RAM
120 Storage unit
121 General-purpose area (user data area)
122 Protected area (secure area)
131 Content
132 Usage control information
133 Converted title key
134 User token
135 Revocation list
136 Medium secret key
137 Medium public key certificate
701 CPU
702 ROM
703 RAM
704 Bus
705 Input and output interface
706 Input unit
707 Output unit
708 Storage unit
709 Communication unit
710 Drive
711 Removable medium
801 CPU
802 ROM
803 RAM
804 Bus
805 Input and output interface
806 Communication unit
807 Storage unit
811 Protected area
812 General-purpose area

The invention claimed is:

1. An information storage device, comprising:
one or more hardware processors configured to:
store an encrypted content;
control access of an external device to the information storage device;
store a converted title key obtained based on conversion of a title key which is an encryption key applied to decryption of the encrypted content, and a user token obtained based on conversion of binding secret information applied to calculate the title key from the converted title key,
wherein the user token is generated by encryption of the binding secret information based on an authentication key, and wherein the authentication key is generated by encryption of a User ID based on a hash value of a password associated with the User ID, and an application key stored in the external device, and wherein the User ID and the password are included in registration account information of a user; and
allow confirmation of the external device to read out the user token, wherein the external device has an access right to the information storage device, and wherein the access right controls the access of the external device to the information storage device,
wherein the user token is data encrypted based on the authentication key with respect to data that includes the binding secret information and a verification value for the binding secret information, and
wherein the binding secret information is a value inherent in the encrypted content.

2. An information processing device, comprising:
one or more hardware processors configured to:
store, in a medium, an encrypted content that is encrypted based on a title key and execute decryption processing of the encrypted content;
acquire, from the medium, a converted title key obtained based on conversion of the title key which is an encryption key applied to the decryption of the encrypted content, and a user token obtained based on conversion of binding secret information applied to calculate the title key from the converted title key,
wherein the user token is generated based on user identification information associated with a user, and wherein the user identification information corresponds to a User ID and a password included in registration account information associated with the user;

generate an authentication key based on of the user identification information and an application key stored in the information processing device, wherein the authentication key is generated by encryption of the User ID based on a hash value of the password included in the registration account information, and the application key;

calculate the binding secret information by computation processing between the user token and the authentication key;

calculate the title key from the converted title key by application of the calculated binding secret information;

execute the decryption processing of the encrypted content by application of the calculated title key, execute decryption processing of the user token to which the authentication key is applied, to calculate the binding secret information and a verification value for the binding secret information; and execute verification processing of the calculated binding secret information based on the calculated verification value.

3. The information processing device according to claim 2, wherein the one or more hardware processors are further configured to execute computation processing with respect to the user ID and the password which are acquired based on input processing via at least one of an input unit or read-out processing from a memory to generate the authentication key.

4. The information processing device according to claim 2, wherein the one or more hardware processors are further configured to execute decryption processing of the user token to which the authentication key is applied, to calculate the binding secret information.

5. The information processing device according to claim 2, wherein the one or more hardware processors are further configured to execute exclusive OR computation between the binding secret information and the converted title key to calculate the title key.

6. A server configured to transmit an encrypted content to an information storage device, the server comprising:

one or more hardware processors configured to:

receive user identification information associated with a user from an information processing device equipped with the information storage device;

generate a user token by computation processing to which the received user identification information is applied, and a converted title key which is converted data of a title key applied to encryption processing of the encrypted content, wherein the user token is generated by encryption of binding secret information based on an authentication key, wherein the authentication key is generated by encryption of a User ID based on a hash value of a password associated with the User ID, and an application key stored in the information processing device, and wherein the User ID and the password are included in registration account information of the user; and transmit the generated user token and converted title key as stored data of the information storage device, wherein the user ID and the password as the user identification information are received as the user identification information, and the authentication key is generated by computation processing with respect to the user ID, the password, and the application key, and wherein binding secret information is generated as an inherent value that corresponds to the encrypted content, and the user token is generated by encryption processing to which the authentication key for the binding secret information is applied.

7. A non-transitory computer-readable medium having stored thereon, computer-executable instructions causing a computer which controls an information storage device comprising one or more hardware processors to perform operations, the operations comprising:

storing an encrypted content, a converted title key obtained based on conversion of a title key which is a decryption key of the encrypted content, and a user token obtained based on conversion of binding secret information applied to calculate the title key from the converted title key, wherein the user token is generated based on user identification information associated with a user, and wherein the user identification information corresponds to a User ID and a password included in registration account information associated with the user;

reproducing the encrypted content;

acquiring the converted title key and the user token from the information storage device;

generating an authentication key based on the user identification information that is acquired by input processing through an input unit or read-out processing from a memory;

wherein the authentication key is generated by encryption of the User ID based on a hash value of the password included in the registration account information and an application key stored in the information processing device;

calculating the binding secret information by computation processing between the user token and the authentication key;

calculating the title key from the converted title key by application of the calculated binding secret information; and executing decryption processing of the encrypted content by application of the calculated title key.

8. An information processing method, comprising:

in an information storage device comprising one or more hardware processors:

storing an encrypted content, a converted title key obtained by converting a title key which is an encryption key applied to decryption of the encrypted content, and a user token obtained by converting binding secret information applied to calculate the title key from the converted title key, wherein the user token is generated by encryption of the binding secret information based on an authentication key, and wherein the authentication key is generated by encryption of a User ID based on a hash value of a password associated with the User ID, and an application key stored in an external device that reproduces the encrypted content, and wherein the User ID and the password are included in registration account information of a user; and controlling access of the external device to the information storage device, wherein the external device having an access right is confirmed therein to read out the user token, wherein the user token is data encrypted based on the authentication key with respect to data that includes the binding secret information and a verification value for the binding secret information, and wherein the binding secret information is a value inherent in the encrypted content.

9. An information processing method, comprising:

in an information processing device that decrypts and reproduces content stored in a medium, the information processing device comprising one or more hardware processors:

storing, in the medium, an encrypted content that is encrypted using a title key and executing decryption processing of the encrypted content;

acquiring, from the medium, a converted title key obtained by converting the title key which is an encryption key applied to the decryption of the encrypted content, and a user token obtained by converting binding secret information applied to calculate the title key from the converted title key, wherein the user token is generated based on user identification information associated with a user, and wherein the user identification information corresponds to a User ID and a password included in registration account information associated with the user;

generating an authentication key based on the user identification information and an application key stored in the information processing device, wherein the authentication key is generated by encryption of the User ID based on a hash value of the password included in the registration account information and the application key;

calculating the binding secret information by computation processing between the user token and the authentication key;

calculating the title key from the converted title key by applying the calculated binding secret information;

executing the decryption processing of the encrypted content by applying the calculated title key, executing decryption processing of the user token to calculate the binding secret information and a verification value, and executing verification processing of the calculated binding secret information based on the calculated verification value.

10. An information processing method, comprising:

in a server that transmits content to an information storage device, the server comprising one or more hardware processors:

receiving user identification information associated with a user from an information processing device equipped with the information storage device;

generating a user token by computation processing to which the received user identification information is applied, and a converted title key which is converted data of a title key applied to encryption processing of the encrypted content, wherein the user token is generated by encryption of binding secret information based on an authentication key, and wherein the authentication key is generated by encryption of a User ID based on a hash value of a password associated with the User ID, and an application key stored in the information processing device, and wherein the User ID and the password are included in registration account information of a user;

transmitting the generated user token and converted title key as stored data of the information storage device, wherein the user ID and the password as the user identification information are received as the user identification information, and the authentication key is generated by computation processing with respect to the user ID, the password, and the application key, and wherein binding secret information is generated as an inherent value that corresponds to the encrypted content, and the user token is generated by encryption processing to which the authentication key for the binding secret information is applied.

11. A non-transitory computer-readable medium having stored thereon, computer-executable instructions causing a computer which controls an information storage device comprising one or more hardware processors to perform operations, the operations comprising:

storing an encrypted content, a converted title key obtained by converting a title key which is an encryption key applied to decryption of the encrypted content, and a user token obtained by converting binding secret information applied to calculate the title key from the converted title key, wherein the user token is generated by encryption of the binding secret information based on an authentication key, and wherein the authentication key is generated by encryption of a User ID based on a hash value of a password associated with the User ID, and an application key stored in an external device that reproduces the encrypted content, and wherein the User ID and the password are included in registration account information of a user; and controlling access of the external device to the information storage device, wherein the external device having an access right is confirmed therein to read out the user token, wherein the user token is data encrypted based on the authentication key with respect to data that includes the binding secret information and a verification value for the binding secret information, and wherein the binding secret information is a value inherent in the encrypted content.

12. A non-transitory computer-readable medium having stored thereon, computer-executable instructions causing a computer which controls an information processing device comprising one or more hardware processors to perform operations, the operations comprising:

storing, in a medium, an encrypted content that is encrypted using a title key and executing decryption processing of the encrypted content;

acquiring, from the medium, a converted title key obtained by converting the title key which is an encryption key applied to the decryption of the encrypted content, and a user token obtained by converting binding secret information applied to calculate the title key from the converted title key, wherein the user token is generated based on user identification information associated with a user, and wherein the user identification information corresponds to a User ID and a password included in registration account information associated with the user;

generating an authentication key based on the user identification information and an application key stored in the information processing device that reproduces the encrypted content, wherein the authentication key is generated by encryption of the User ID based on a hash value of the password included in the registration account information and the application key;

calculating the binding secret information by computation processing between the user token and the authentication key;

calculating the title key from the converted title key by applying the calculated binding secret information; and decrypting processing of the encrypted content by applying the calculated title key, executing decryption processing of the user token to calculate the binding secret information and a verification value, and executing verification processing of the calculated binding secret information based on the calculated verification value.

* * * * *